US011205785B2

(12) United States Patent
Chikugo et al.

(10) Patent No.: US 11,205,785 B2
(45) Date of Patent: Dec. 21, 2021

(54) FUEL CELL SYSTEM AND METHOD FOR WARMING UP FUEL CELL SYSTEM

(71) Applicant: NISSAN MOTOR CO., LTD., Yokohama (JP)

(72) Inventors: Hayato Chikugo, Kanagawa (JP); Shinichi Miyazaki, Kanagawa (JP); Tatsuya Yaguchi, Kanagawa (JP); Masashi Sato, Kanagawa (JP)

(73) Assignee: NISSAN MOTOR CO., LTD., Yokohama (JP)

(*) Notice: Subject to any disclaimer, the term of this patent is extended or adjusted under 35 U.S.C. 154(b) by 0 days.

(21) Appl. No.: 16/638,223

(22) PCT Filed: Aug. 14, 2017

(86) PCT No.: PCT/JP2017/029313
§ 371 (c)(1),
(2) Date: Feb. 11, 2020

(87) PCT Pub. No.: WO2019/035167
PCT Pub. Date: Feb. 21, 2019

(65) Prior Publication Data
US 2020/0365916 A1 Nov. 19, 2020

(51) Int. Cl.
*H01M 8/04* (2016.01)
*H01M 8/04014* (2016.01)
(Continued)

(52) U.S. Cl.
CPC ... *H01M 8/04022* (2013.01); *H01M 8/04268* (2013.01); *H01M 8/04708* (2013.01); *H01M 8/04738* (2013.01)

(58) Field of Classification Search
CPC ......... H01M 8/04022; H01M 8/04738; H01M 8/04268; H01M 8/04708
See application file for complete search history.

(56) References Cited

U.S. PATENT DOCUMENTS

2003/0235732 A1* 12/2003 Haltiner, Jr. .......... H01M 8/241
429/440
2004/0040281 A1* 3/2004 Yamaguchi ......... H01M 8/0612
60/274
(Continued)

FOREIGN PATENT DOCUMENTS

CN 1372343 A 10/2002
CN 105594045 A 5/2016
(Continued)

Primary Examiner — Michael L Dignan
(74) Attorney, Agent, or Firm — Foley & Lardner LLP

(57) ABSTRACT

A fuel cell system includes a fuel cell configured to be supplied with fuel and air to generate electricity, a reformer configured to reform the fuel to be supplied to the fuel cell, a heat source device configured to heat an off-gas discharged from the fuel cell to produce a heating gas and configured to heat the reformer, a fuel cell heating device configured to heat the air to be supplied to the fuel cell using the heating gas, a fuel cell temperature acquisition unit configured to acquire a temperature of the fuel cell, and a reformer temperature acquisition unit configured to acquire a temperature of the reformer. The fuel cell system includes a controller configured to, in a warm-up operation to perform a warm-up of the reformer and a warm-up of the fuel cell, control at least one of the heat source device and the fuel cell heating device based on the temperature of the reformer and the temperature of the fuel cell to adjust at least one of a heating amount of the off-gas and a heating amount of the air by the heating gas.

8 Claims, 9 Drawing Sheets

(51) Int. Cl.
*H01M 8/04223* (2016.01)
*H01M 8/04701* (2016.01)

(56) References Cited

U.S. PATENT DOCUMENTS

| | | | |
|---|---|---|---|
| 2005/0249991 A1* | 11/2005 | Pastula | H01M 8/0612 |
| | | | 429/423 |
| 2009/0291335 A1 | 11/2009 | Anzai | |
| 2014/0038071 A1* | 2/2014 | Ogawa | H01M 8/04373 |
| | | | 429/425 |
| 2015/0221961 A1 | 8/2015 | Takeuchi et al. | |
| 2016/0141692 A1* | 5/2016 | Barnard | H01M 8/04753 |
| | | | 429/413 |
| 2018/0375127 A1 | 12/2018 | Yamazaki et al. | |

FOREIGN PATENT DOCUMENTS

| | | | | |
|---|---|---|---|---|
| JP | 2003-17103 A | | 1/2003 | |
| JP | 2003-059521 | * | 2/2003 | ............ H01M 8/08 |
| JP | 2003-59521 A | | 2/2003 | |
| JP | 2006-172948 A | | 6/2006 | |
| JP | 2006-190605 A | | 7/2006 | |
| JP | 2008-277280 A | | 11/2008 | |
| JP | 2011-159585 A | | 8/2011 | |
| JP | 2014-10944 A | | 1/2014 | |
| JP | 2015-220020 A | | 12/2015 | |
| JP | 2016-154067 A | | 8/2016 | |
| WO | WO 2017/110513 A1 | | 6/2017 | |

* cited by examiner

FUEL CELL SYSTEM AND METHOD FOR WARMING UP FUEL CELL SYSTEM

TECHNICAL FIELD

The present invention relates to a fuel cell system and a method for warming up the fuel cell system.

BACKGROUND ART

JP2016-154067A discloses a fuel cell system including a start-up combustor and a reformer and configured to switch a supply destination of raw fuel between the start-up combustor and the reformer when starting the system. Specifically, when the temperature of the reformer is less than a reforming possible temperature, the raw fuel is supplied to the start-up combustor through a first fuel supply passage, and after the temperature of the reformer reaches the reforming possible temperature, the raw fuel is supplied to the reformer through a second fuel supply passage.

That is, in the fuel cell system of JP2016-154067A, until the reformer reaches the reforming possible temperature (until the warm-up of the reformer is finished), components other than the reformer are heated by the start-up combustor to promote the warm-up of those components, and after the warm-up of the reformer is completed, the raw fuel is supplied to the reformer so that the reforming process is performed.

SUMMARY OF INVENTION

In JP2016-154067A, since the start-up combustor is operated even before the warm-up of the reformer, the warm-up of the other system constituent elements such as a fuel cell stack progresses. However, when the warm-up of the fuel cell progresses even though the warm-up of the reformer is not completed, there is a concern such as an occurrence of oxidative degradation of an anode catalyst of the fuel cell or an adverse effect on the heat resistance of the fuel cell.

It is an object of the present invention to provide a fuel cell system and a method for warming up the fuel cell system, that can solve the above-described problem.

According to an aspect of the present invention, a fuel cell system includes a fuel cell configured to be supplied with fuel and air to generate electricity, a reformer configured to reform the fuel to be supplied to the fuel cell, a heat source device configured to heat an off-gas discharged from the fuel cell to produce a heating gas and configured to heat the reformer, a fuel cell heating device configured to heat the air to be supplied to the fuel cell using the heating gas, a fuel cell temperature acquisition unit configured to acquire a temperature of the fuel cell, and a reformer temperature acquisition unit configured to acquire a temperature of the reformer. The fuel cell system includes a controller configured to, in a warm-up operation to perform a warm-up of the reformer and a warm-up of the fuel cell, control at least one of the heat source device and the fuel cell heating device based on the temperature of the reformer and the temperature of the fuel cell to adjust at least one of a heating amount of the off-gas and a heating amount of the air by the heating gas.

DESCRIPTION OF EMBODIMENTS

Hereinafter, embodiments of the present invention will be described with reference to the drawings.

First Embodiment

Figure 1:
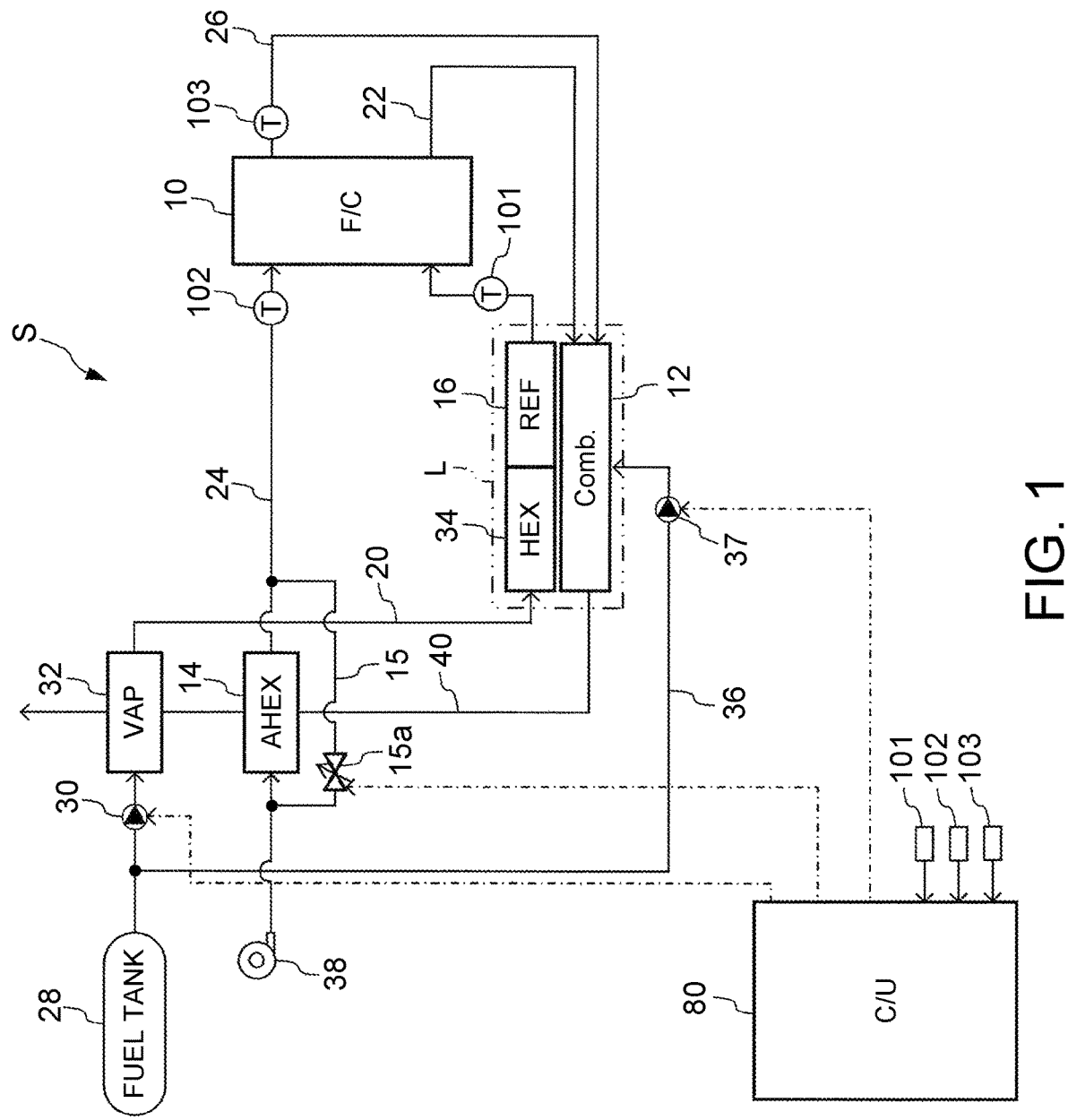
FIG. 1 is a diagram for explaining the configuration of a fuel cell system according to a first embodiment.

FIG. 1 illustrates the configuration of a fuel cell system S according to a first embodiment of the present invention.

As illustrated, the fuel cell system S according to this embodiment is installed in a vehicle or the like and includes a fuel cell stack 10, a discharged gas combustor 12 forming a heat source device, an air heat exchanger 14, a bypass passage 15, and a bypass valve 15a that form a fuel cell heating device, a reformer 16, and a controller 80.

The fuel cell stack 10 is formed by stacking a plurality of fuel cells or fuel-cell unit cells, and the individual fuel cells serving as power generation sources are each, for example, a solid oxide fuel cell (SOFC: Solid Oxide Fuel Cell).

In the anode system, the fuel cell stack 10 is provided with a main fuel supply passage 20 for supplying fuel (e.g. hydrogen) as a reductant gas to an anode electrode of the fuel cell stack 10, and an anode off-gas passage 22 for the flow of anode off-gas after power generation reaction that is discharged from the anode electrode.

In the cathode system, the fuel cell stack 10 is provided with a main air supply passage 24 for supplying air as an oxidant gas to a cathode electrode of the fuel cell stack 10, and a cathode off-gas passage 26 for the flow of cathode off-gas after power generation reaction that is discharged from the cathode electrode. That is, the anode off-gas and the cathode off-gas of this embodiment correspond to an off-gas discharged from the fuel cell stack 10.

The main fuel supply passage 20 is provided with a raw fuel tank 28, a first injector 30, an evaporator 32, a reformer heat exchanger 34, the reformer 16, and a reformed fuel temperature sensor 101 in this order from upstream.

Further, the main fuel supply passage 20 is provided with a combustor fuel supply passage 36 that branches between the raw fuel tank 28 and the first injector 30 and is connected to the discharged gas combustor 12. The combustor fuel supply passage 36 is provided with a second injector 37.

The raw fuel tank 28 stores, as raw fuel before reforming, liquid fuel composed of a mixture of oxygenated fuel (e.g. ethanol) and water. The liquid fuel stored in the raw fuel tank 28 is adjusted to predetermined injection amounts respectively by the first injector 30 of the main fuel supply passage 20 and the second injector 37 of the combustor fuel supply passage 36 and supplied to the evaporator 32 and the discharged gas combustor 12.

That is, in this embodiment, the first injector 30 is configured to be adjustable in opening degree so as to adjust the flow rate of fuel gas to be supplied to the fuel cell stack 10 through evaporation by the evaporator 32 and reforming by the reformer 16.

Further, the second injector 37 is configured to be adjustable in opening degree so as to adjust the amount of liquid fuel to be supplied to the discharged gas combustor 12. Therefore, in this embodiment, the fuel supply amount to the discharged gas combustor 12 (hereinafter also referred to as a "fuel injection amount Fcomb") corresponding to the calorific value of a combustion gas produced in the discharged gas combustor 12, which will be described later, can be adjusted by controlling the opening degree of the second injector 37.

The evaporator 32 heats the liquid fuel supplied from the raw fuel tank 28 through the first injector 30 to produce an unreformed fuel gas composed of ethanol gas and water vapor.

The reformer heat exchanger 34 performs the heat exchange between the combustion gas from the discharged gas combustor 12 and the unreformed fuel gas, thereby heating the unreformed fuel gas.

The reformer 16 reforms the unreformed fuel gas into a state suitable for supply to the fuel cell stack 10. For example, the reformer 16 performs steam reforming of the unreformed fuel gas using a non-illustrated reforming catalyst, thereby producing a fuel gas composed mainly of hydrogen.

The reformed fuel temperature sensor 101 detects the temperature of the fuel gas, reformed by the reformer 16, before being supplied to the fuel cell stack 10. In this embodiment, the temperature of the fuel gas, reformed by the reformer 16, before being supplied to the fuel cell stack 10 is regarded as the temperature of the reformer 16. That is, the reformed fuel temperature sensor 101 functions as a reformer temperature acquisition unit that detects the temperature of the fuel gas before being supplied to the fuel cell stack 10 as a "reformer temperature Tr".

Next, the anode off-gas passage 22 connects an anode outlet of the fuel cell stack 10 to the discharged gas combustor 12. Consequently, an anode off-gas after power generation reaction discharged from the anode electrode is supplied to the discharged gas combustor 12 through the anode off-gas passage 22.

On the other hand, an air pump 38 that pumps air into the main air supply passage 24 is provided at an inlet of the main air supply passage 24. The main air supply passage 24 is provided with the bypass passage 15, the air heat exchanger 14, and a stack air electrode inlet temperature sensor 102 in this order from upstream and connected to an air electrode inlet of the fuel cell stack 10 at its other end.

The bypass passage 15 is provided to connect a position upstream of the air heat exchanger 14 and a position downstream of the air heat exchanger 14 in the main air supply passage 24 to each other. Therefore, part of the air from the air pump 38 can be supplied to the fuel cell stack 10 through the bypass passage 15, bypassing the air heat exchanger 14.

The bypass passage 15 is provided with the bypass valve 15a. The bypass valve 15a is configured such that the opening degree (hereinafter also referred to as a "bypass valve opening degree Oby") can be adjusted continuously or stepwise. Therefore, by adjusting the bypass valve opening degree Oby of the bypass valve 15a as appropriate, the flow rate of air that flows in the bypass passage 15, i.e. the air flow rate that bypasses the air heat exchanger 14 (hereinafter also referred to as a "bypass air flow rate qby"), can be adjusted. As a result, it is possible to adjust the air flow rate that passes through the air heat exchanger 14 (hereinafter also referred to as a "heat exchanger passing air flow rate qex").

The air heat exchanger 14 is a device that heats at least part of air supplied from the air pump 38 by performing the heat exchange with a combustion gas produced in the discharged gas combustor 12, which will be described later. The air heated by the air heat exchanger 14 in this way is supplied to the fuel cell stack 10. Hereinafter, the flow rate of air that is supplied to the fuel cell stack 10 will also be referred to as a "stack supply air flow rate qst".

The stack air electrode inlet temperature sensor 102 is provided in the main air supply passage 24 near the inlet of the cathode electrode of the fuel cell stack 10 and detects the temperature of air to be supplied to the cathode electrode of the fuel cell stack 10. That is, the temperature of air detected by the stack air electrode inlet temperature sensor 102 is a detected value of the temperature of air near the cathode electrode inlet of the fuel cell stack 10, which is a mixture of air heated by the air heat exchanger 14 and air supplied through the bypass passage 15. In this embodiment, the temperature of air detected by the stack air electrode inlet temperature sensor 102 is regarded as the temperature of the fuel cell (hereinafter also referred to as a "stack temperature Ts").

On the other hand, the cathode off-gas passage 26 connects a cathode outlet of the fuel cell stack 10 to the discharged gas combustor 12. Consequently, as described above, a cathode off-gas after power generation reaction discharged from the cathode electrode is supplied to the discharged gas combustor 12 through the cathode off-gas passage 26.

The cathode off-gas passage 26 is provided with a stack air electrode outlet temperature sensor 103 near the outlet of the cathode electrode of the fuel cell stack 10. The stack air electrode outlet temperature sensor 103 detects a "stack air electrode outlet temperature Tsc_o" which is the temperature of a cathode off-gas discharged from the cathode electrode of the fuel cell stack 10.

The discharged gas combustor 12 is supplied with liquid fuel from the raw fuel tank 28 through the second injector 37 of the combustor fuel supply passage 36 and supplied with an anode off-gas and an air electrode off-gas from the fuel cell stack 10 through the anode off-gas passage 22 and the cathode off-gas passage 26.

The discharged gas combustor 12 produces a combustion gas (heating gas) by catalytic combustion of a mixture of these liquid fuel, anode off-gas, and cathode off-gas using a non-illustrated combustion catalyst. When the calorific value required for a combustion gas to be produced is low, or the like, the discharged gas combustor 12 is also capable of producing a combustion gas by catalytic combustion of a mixture of an anode off-gas and an air electrode off-gas without being supplied with liquid fuel from the raw fuel tank 28.

Further, a combustion gas passage 40 is connected to the discharged gas combustor 12 on the downstream side. The combustion gas passage 40 is provided with the air heat exchanger 14 and the evaporator 32 in this order from upstream and communicates with the outside air at its other end. In this embodiment, the combustion gas passage 40 supplies a combustion gas produced in the discharged gas combustor 12 to the air heat exchanger 14 and the evaporator 32.

In this embodiment, it is configured that the reformer heat exchanger 34 and the reformer 16 are housed in a case (indicated by a two-dot chain line) shared with the discharged gas combustor 12 so that the calorific value of the combustion gas is transferred to the reformer heat exchanger 34 and the reformer 16 inside the shared case L. That is, in this embodiment, the discharged gas combustor 12 functions as a heat source device that heats the reformer 16.

In the fuel cell system S having the configuration described above, when the bypass valve opening degree Oby of the bypass valve 15a in the bypass passage 15 is increased to increase the bypass air flow rate qby, the heat exchanger passing air flow rate qex is reduced. Therefore, while air that is heat-exchanged with a combustion gas in the air heat exchanger 14 is relatively reduced, air that passes through the bypass passage 15 and thus is not heated is relatively increased. Consequently, the calorific value of air as a result of joining of them, which is supplied to the fuel cell stack 10, is reduced. That is, the heating rate of the fuel cell stack 10 by this air is reduced.

In terms of the combustion gas in the combustion gas passage 40, the calorific value that is lost by the heat exchange with the air in the air heat exchanger 14 is reduced. Therefore, since the calorific value of the combustion gas that is supplied to the evaporator 32 after the heat exchange in the air heat exchanger 14 is relatively increased, the heating rate of the evaporator 32 is improved. Further, conversely, when the bypass valve opening degree Oby of the bypass valve 15a in the bypass passage 15 is reduced to reduce the bypass air flow rate qby, the heating rate of the fuel cell stack 10 is improved, while the heating rate of the evaporator 32 is reduced. Therefore, the balance between the heating rate of the fuel cell stack 10 and the heating rate of the evaporator 32 can also be adjusted by adjusting the bypass valve opening degree Oby of the bypass valve 15a.

The controller 80 is composed of a computer, particularly a microcomputer, including a central processing unit (CPU), a read only memory (ROM), a random access memory (RAM), and an input/output interface (I/O interface). The controller 80 is programmed to execute at least processes necessary for performing respective processes according to this embodiment or a later-described modification 1 or 2 or second embodiment.

The controller 80 may be configured as a single device or may be configured by a plurality of separate devices so as to perform distributed processing of respective controls of this embodiment by the plurality of devices.

The controller 80 controls the operations of various devices and components that are required for operating the fuel cell system S. In particular, the controller 80 of this embodiment receives at least signals of detected values of the reformed fuel temperature sensor 101 and the stack air electrode inlet temperature sensor 102, and preferably signals of detected values of the stack air electrode outlet temperature sensor 103, and controls the bypass valve 15a, the second injector 37, and so on based on these signals.

In this embodiment, for example, in response to receipt of a start request signal for the fuel cell system S that is produced by an operation of a predetermined SOFC start switch or the like, the controller 80 performs a warm-up operation (warm-up control) in which the warm-up of the fuel cell stack 10 and the warm-up of the reformer 16 are performed in parallel.

Herein, the warm-up of the fuel cell stack 10 refers to a process that increases (heats) the temperature of the fuel cell stack 10, which is in a low temperature state (e.g. a normal temperature state) during suspension of operation or the like, to a warm-up target temperature (hereinafter also referred to as a "stack warm-up target temperature Ts_t") that is, for example, equal to or more than 500° C. In particular, the stack warm-up target temperature Ts_t is set to a temperature around an oxidative degradation point (e.g. a predetermined temperature between 400° C. and 500° C.) that is a temperature at which oxidative degradation of an anode catalyst (mainly nickel) of the fuel cell stack 10 occurs, and preferably to a temperature exceeding the oxidative degradation point.

The warm-up of the reformer 16 refers to a process that increases (heats) the temperature of the reformer 16, which is in a low temperature state during suspension of operation or the like, to a warm-up target temperature (hereinafter also referred to as a "reformer warm-up target temperature Tr_t") that is, for example, about 600° C. to 700° C. at which the steam reforming of the unreformed fuel gas described above is enabled.

In the above-described warm-up operation, based on the stack temperature Ts and the reformer temperature Tr, the controller 80 controls the second injector 37 to adjust the fuel injection amount Fcomb which is a fuel supply amount to the discharged gas combustor 12.

Further, in the above-described warm-up operation, based on the stack temperature Ts and the reformer temperature Tr, the controller 80 controls at least the bypass valve 15a (the bypass valve opening degree Oby) to adjust the bypass air flow rate qby (the heat exchanger passing air flow rate qex).

Figure 2:
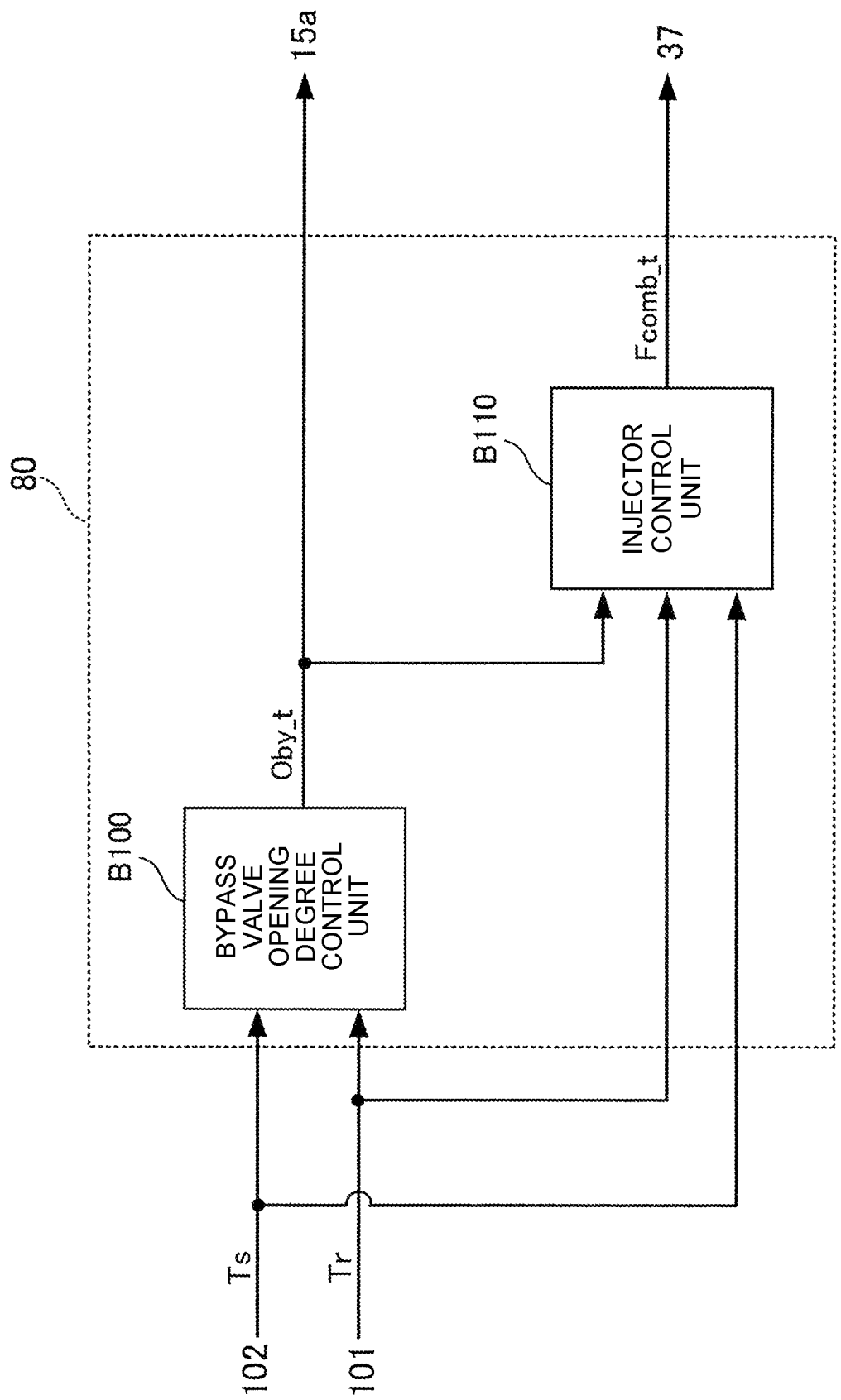
FIG. 2 is a block diagram for explaining a warm-up operation of the fuel cell system according to the first embodiment.

FIG. 2 is a block diagram for explaining the warm-up operation of the fuel cell system S in this embodiment. The functions of calculation units illustrated in this block diagram are realized by the hardware and software (programs) forming the controller 80.

As illustrated, the controller 80 of this embodiment includes a bypass valve opening degree control unit B100 and an injector control unit B110.

The reformer temperature Tr detected by the reformed fuel temperature sensor 101 and the stack temperature Ts detected by the stack air electrode inlet temperature sensor 102 are input to the bypass valve opening degree control unit B100.

The bypass valve opening degree control unit B100 adjusts the bypass valve opening degree Oby of the bypass valve 15a based on the reformer temperature Tr and the stack temperature Ts.

Specifically, the bypass valve opening degree control unit B100 calculates a target bypass valve opening degree Oby_t being a target opening degree of the bypass valve 15a so that the reformer temperature Tr and the stack temperature Ts respectively become desired values, and operates the bypass valve 15a so that the bypass valve opening degree Oby approaches the target bypass valve opening degree Oby_t.

In particular, in this embodiment, the bypass valve opening degree control unit B100 calculates the target bypass valve opening degree Oby_t based on the warm-up degree of the fuel cell stack 10 and the warm-up degree of the reformer 16.

Herein, the warm-up degree of the fuel cell stack 10 is an index (parameter) indicating to what degree the warm-up of the fuel cell stack 10 has progressed relative to the completion of this warm-up. Therefore, the warm-up degree of the fuel cell stack 10 can be calculated in terms of to what degree the current stack temperature Ts approaches the temperature (the stack warm-up target temperature Ts_t) at which the warm-up of the fuel cell stack 10 should be finished.

For example, the bypass valve opening degree control unit B100 calculates, as the warm-up degree of the fuel cell stack 10, a ratio of the stack temperature Ts to the stack warm-up target temperature Ts_t. For example, the ratio of the stack temperature Ts to the stack warm-up target temperature Ts_t can be calculated as the deviation between them or the quotient between them (=Ts/Ts_t). Hereinafter, the warm-up degree of the fuel cell stack 10 will also be referred to as a "stack warm-up degree Wst_e".

Likewise, the warm-up degree of the reformer 16 is defined as a parameter indicating to what degree the warm-up of the reformer 16 has progressed relative to the completion of this warm-up. Therefore, the warm-up degree of the reformer 16 can also be calculated in terms of to what degree the current reformer temperature Tr approaches the temperature (the reformer warm-up target temperature Tr_t) at which the warm-up of the reformer 16 should be finished.

For example, the bypass valve opening degree control unit B100 calculates, as the warm-up degree of the reformer 16, a ratio of the reformer temperature Tr to the reformer warm-up target temperature Tr_t. For example, the ratio of the reformer temperature Tr to the reformer warm-up target temperature Tr_t can be calculated as the deviation between them or the quotient between them (=Tr/Tr_t). Hereinafter, the warm-up degree of the reformer 16 will also be referred to as a "reformer warm-up degree Wr_e".

The bypass valve opening degree control unit B100 calculates a target bypass air flow rate qby_t being a target value of the bypass air flow rate qby so that the reformer temperature Tr (the reformer warm-up degree Wr_e) and the stack temperature Ts (the stack warm-up degree Wst_e) respectively become desired values. Then, the bypass valve opening degree control unit B100 operates the bypass valve 15a so that the bypass valve opening degree Oby approaches the target bypass valve opening degree Oby_t corresponding to the target bypass air flow rate qby_t.

For example, as the stack warm-up degree Wst_e increases, the bypass valve opening degree control unit B100 calculates the target bypass valve opening degree Oby_t to be greater so as to increase the bypass air flow rate qby (reduce the heat exchanger passing air flow rate qex). That is, in this case, the bypass valve opening degree control unit B100 increases the bypass valve opening degree Oby according to an increase of the stack warm-up degree Wst_e.

Then, the reformer temperature Tr detected by the reformed fuel temperature sensor 101, the stack temperature Ts detected by the stack air electrode inlet temperature sensor 102, and the target bypass valve opening degree Oby_t calculated by the bypass valve opening degree control unit B100 are input to the injector control unit B110.

Based on the reformer temperature Tr (the reformer warm-up degree Wr_e) and the stack temperature Ts (the stack warm-up degree Wst_e) and referring to the target bypass valve opening degree Oby_t, the injector control unit B110 controls the opening degree of the second injector 37 to adjust the fuel injection amount Fcomb being an injection amount of fuel to the discharged gas combustor 12.

Specifically, referring to the target bypass valve opening degree Oby_t, the injector control unit B110 calculates a target fuel injection amount Fcomb_t being a target value of the fuel injection amount Fcomb so that the reformer temperature Tr (the reformer warm-up degree Wr_e) and the stack temperature Ts (the stack warm-up degree Wst_e) take desired values. Then, the injector control unit B110 operates the second injector 37 to adjust its opening degree so that the fuel injection amount Fcomb approaches the target fuel injection amount Fcomb_t.

For example, as the reformer warm-up degree Wr_e increases, the injector control unit B110 calculates the target fuel injection amount Fcomb_t to be smaller so as to reduce the fuel injection amount Fcomb. Further, for example, as the stack warm-up degree Wst_e increases, the injector control unit B110 calculates the target fuel injection amount Fcomb_t to be smaller so as to reduce the fuel injection amount Fcomb.

Next, an example of a further specific control aspect of the bypass valve opening degree Oby and the fuel injection amount Fcomb by the bypass valve opening degree control unit B100 and the injector control unit B110 described above will be described.

Figure 3:
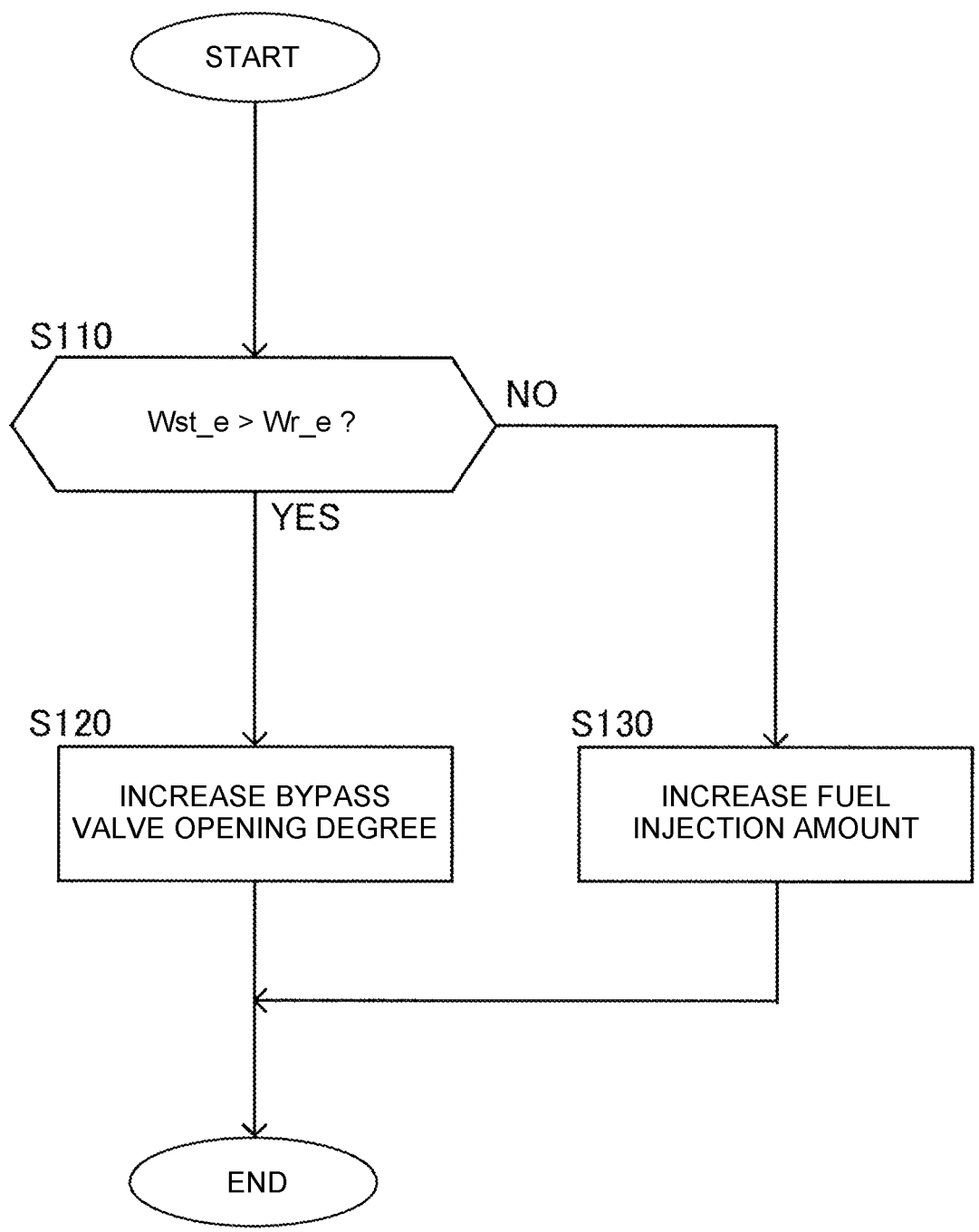
FIG. 3 is a flowchart for explaining one aspect of the warm-up operation of the fuel cell system according to the first embodiment.

FIG. 3 is a flowchart for explaining one aspect of the control of the bypass valve opening degree Oby and the fuel injection amount Fcomb based on the stack warm-up degree Wst_e and the reformer warm-up degree Wr_e in this embodiment.

As illustrated, at step S110, the controller 80 determines the magnitude relationship between the stack warm-up degree Wst_e and the reformer warm-up degree Wr_e. Then, when the controller 80 has determined that the stack warm-up degree Wst_e is greater than the reformer warm-up degree Wr_e, it performs a process of step S120.

Herein, the stack warm-up degree Wst_e being greater than the reformer warm-up degree Wr_e means a case where the progress of the warm-up of the reformer 16 is slow compared to the progress of the warm-up of the fuel cell stack 10.

In such a case, for example, it may happen that even though the reforming process of fuel in the reformer 16 cannot be properly performed, the stack temperature Ts of the fuel cell stack 10 increases to a certain value or more. As a result, even though a fuel gas is not sufficiently supplied to the anode electrode of the fuel cell stack 10, since the stack temperature Ts becomes high, the inside of the anode electrode becomes an oxidizing atmosphere in which oxidation reactions tend to proceed. When the inside of the anode electrode becomes the oxidizing atmosphere, undesirable oxidation reactions other than an oxidation reaction according to normal power generation tend to occur as a result of reactions between oxygen and materials, such as the catalyst, forming the anode electrode.

In particular, when the inside of the anode electrode becomes the oxidizing atmosphere in the state where the warm-up of the fuel cell stack 10 has progressed to a degree at which the stack temperature Ts exceeds the above-described oxidative degradation point, there is a possibility that nickel forming the anode catalyst and oxygen react irreversibly with each other to degrade the anode catalyst.

Further, in this case, when the warm-up of the fuel cell stack 10 is not suppressed but continued along with the warm-up of the reformer 16 even though the warm-up of the fuel cell stack 10 has progressed to some degree, it is not preferable in terms of the heat resistance of the fuel cell stack 10. In this regard, in this embodiment, the occurrence of such a situation is suppressed by the process of step S120.

That is, at step S120, the controller 80 increases the bypass valve opening degree Oby. Consequently, the ratio of air bypassing the air heat exchanger 14 in the main air supply passage 24 increases (see FIG. 1). Therefore, the heat exchanger passing air flow rate qex decreases so that the substantial heating amount by the air heat exchanger 14 for air to be supplied to the fuel cell stack 10 decreases. As a result, the heating amount of the fuel cell stack 10 is reduced so that the temperature rise of the fuel cell stack 10 is suppressed.

Therefore, since the warm-up speed of the fuel cell stack 10 can be suppressed by performing the process of step S120, it is possible to suppress the occurrence of oxidation reactions in the anode electrode of the fuel cell stack 10, i.e. it is possible to suppress that the inside of the anode electrode falls into an oxidizing atmosphere. Further, since the temperature rise of the fuel cell stack 10 is suppressed, it is possible to protect the constituent components of the fuel cell stack 10 more reliably also in terms of heat resistance.

On the other hand, at step S110 described above, when it is determined that the stack warm-up degree Wst_e is not greater than the reformer warm-up degree Wr_e, that is, when it is determined that the reformer warm-up degree Wr_e is greater than the stack warm-up degree Wst_e, the controller 80 performs a process of step S130.

Herein, the reformer warm-up degree Wr_e being greater than the stack warm-up degree Wst_e means a case where the progress of the warm-up of the fuel cell stack 10 is slow compared to the progress of the warm-up of the reformer 16.

In this case, the situation is such that the reformer temperature Tr is likely to reach the operating temperature (the temperature at which reforming of raw fuel is enabled) of the reformer 16 before the stack temperature Ts reaches the temperature at which oxidative degradation of the anode catalyst can occur. Therefore, in terms of quickly completing the warm-up operation, the second injector 37 is controlled to increase the fuel injection amount Fcomb.

Therefore, at step S130, in terms of quickly completing the warm-up operation, the controller 80 controls the second injector 37 to increase the fuel injection amount Fcomb. Consequently, the temperature rise (warm-up) of both the fuel cell stack 10 and the reformer 16 is promoted.

According to the fuel cell system S of this embodiment described above, the following operations and effects are exhibited.

The fuel cell system S of this embodiment includes the fuel cell stack 10 as a fuel cell that is supplied with fuel and air to generate electricity, the reformer 16 that reforms the fuel to be supplied to the fuel cell stack 10, the heat source device (12, 37) that heats an off-gas (cathode off-gas and anode off-gas) discharged from the fuel cell stack 10 to produce a heating gas (combustion gas) and heats the reformer 16, the fuel cell heating device (14, 15, 15a) that heats the air to be supplied to the fuel cell stack 10 by the heat exchange with the combustion gas, the stack air electrode inlet temperature sensor 102 as a fuel cell temperature acquisition unit that acquires a temperature of the fuel cell stack 10, and the reformed fuel temperature sensor 101 as a reformer temperature acquisition unit that acquires a temperature of the reformer 16.

The fuel cell system S includes the controller 80 that, in the warm-up operation to perform the warm-up of the fuel cell stack 10 and the warm-up of the reformer 16, controls the heat source device (12, 37) and the fuel cell heating device (14, 15, 15a) based on the reformer temperature Tr being the temperature of the reformer 16 and the stack temperature Ts being the temperature of the fuel cell stack 10, thereby adjusting the heating amount of the off-gas (the fuel injection amount Fcomb) and the heating amount of the air by the heating gas (the heat exchanger passing air flow rate qex) ("the bypass valve opening degree control unit B100" and "the injector control unit B110" in FIG. 2).

Consequently, the warm-up progress balance can be properly controlled according to the progress states of the warm-up of the fuel cell stack 10 and the warm-up of the reformer 16 based on the stack temperature Ts and the reformer temperature Tr. Therefore, it is possible to suppress the inconvenience that is caused by unbalance of the progress degrees of the warm-up of the fuel cell stack 10 and the warm-up of the reformer 16, for example, the inconvenience such as the loss of heat resistance of the fuel cell stack 10 and the reformer 16, or the occurrence of oxidative degradation reactions in the anode electrode.

In particular, in this embodiment, the fuel cell heating device (14, 15, 15a) includes the air heat exchanger 14 provided to the main air supply passage 24 being an air supply passage for supplying the air to the fuel cell stack 10 and configured to perform the heat exchange of the air in the main air supply passage 24 with the heating gas, the bypass passage 15 provided to the main air supply passage 24 to bypass the air heat exchanger 14, and the bypass valve 15a provided in the bypass passage 15. The controller 80 controls the bypass valve opening degree Oby being an opening degree of the bypass valve 15a to adjust the heat exchanger passing air flow rate qex being an air flow rate to be supplied to the air heat exchanger 14 (the bypass valve opening degree control unit B100 in FIG. 2).

With this configuration, the heat exchanger passing air flow rate qex can be adjusted by the simple method of operating the bypass valve 15a to adjust the bypass valve opening degree Oby. As a result, the calorific value of the air to be supplied to the fuel cell stack 10, i.e. the heating amount of the fuel cell stack 10, can be adjusted by adjusting the bypass valve opening degree Oby, so that it is possible to properly control the stack warm-up degree Wst_e.

For example, by increasing the bypass valve opening degree Oby to increase the bypass air flow rate qby, the heat exchanger passing air flow rate qex is reduced. Therefore, the air that is heat-exchanged with the combustion gas in the air heat exchanger 14 is relatively reduced. Consequently, the calorific value of the air that is supplied to the fuel cell stack 10 after the heat exchange is reduced. That is, the heating rate of the fuel cell stack 10 by this air is reduced so that it is possible to suppress the warm-up speed of the fuel cell stack 10. Conversely, when the bypass air flow rate qby is reduced, the heat exchanger passing air flow rate qex is increased so that it is possible to increase the warm-up speed of the fuel cell stack 10.

In the fuel cell system S of this embodiment, the heat source device (12, 37) includes the discharged gas combustor 12 that produces the combustion gas as the heating gas by burning the off-gas, and a fuel supply amount adjustment unit (37) that adjusts the fuel injection amount Fcomb being an amount of the fuel to be supplied to the discharged gas combustor 12. The controller 80 controls the fuel supply amount adjustment unit (37) to adjust the fuel injection amount Fcomb.

Consequently, the function of the heat source device (12, 37) to heat the off-gas of the fuel cell stack 10 can be realized by the existing discharged gas combustor 12. That is, the function of heating the reformer 16 and the function of producing the combustion gas as the heating gas for use in heating the fuel cell stack 10 can be realized without causing complication of the configuration of the fuel cell system S.

The fuel cell system S of this embodiment further includes the raw fuel tank 28 storing liquid fuel being raw fuel, the combustor fuel supply passage 36 for supplying the fuel from the raw fuel tank 28 to the discharged gas combustor 12, and the combustion gas passage 40 as a combustion gas supply passage for supplying the combustion gas produced in the discharged gas combustor 12 to the air heat exchanger 14. The heat source device (12, 37) includes the second injector 37. The controller 80 controls the second injector 37 to adjust the fuel injection amount Fcomb (the injector control unit B110).

Consequently, the specific system configuration for performing the warm-up operation in the fuel cell system S according to this embodiment is provided.

Further, in the warm-up operation of this embodiment, the controller 80 reduces the amount of the air for the heat exchange with the combustion gas when the stack warm-up degree Wst_e based on the stack temperature Ts is greater than the reformer warm-up degree Wr_e based on the reformer temperature Tr. More specifically, when the stack warm-up degree Wst_e is greater than the reformer warm-up degree Wr_e, the bypass valve opening degree Oby is increased to reduce the heat exchanger passing air flow rate qex (step S110 and step S120 in FIG. 3).

Consequently, when the progress of the warm-up of the fuel cell stack 10 is advanced relative to the progress of the warm-up of the reformer 16, it is possible to reduce the heating amount of the fuel cell stack 10 to suppress the warm-up speed thereof. Therefore, for example, in the state where the warm-up of the fuel cell stack 10 is advanced relative to the warm-up of the reformer 16 so that the stack temperature Ts can reach the temperature at which there is a concern that undesirable oxidation reactions occur in the anode electrode, it is possible to delay the progress of the warm-up of the fuel cell stack 10. Therefore, it is possible to suppress the heating (temperature rise) of the fuel cell stack 10 until the warm-up of the reformer 16 progresses to some degree to enable reforming of the fuel so that it is possible to supply a fuel gas to the fuel cell stack 10. That is, it is possible to suppress the occurrence of undesirable oxidation reactions in the anode electrode during the warm-up operation. Since the heating of the fuel cell stack 10 is suppressed in this way, the protection of the constituent components of the fuel cell stack 10 in terms of heat resistance can also be more preferable.

Further, in the warm-up operation of this embodiment, the controller 80 increases the heating amount of the off-gas (the fuel injection amount Fcomb) when the reformer warm-up degree Wr_e is greater than the stack warm-up degree Wst_e.

When the reformer warm-up degree Wr_e is greater than the stack warm-up degree Wst_e, the situation is such that the reformer temperature Tr is likely to reach the operating temperature (the temperature at which reforming of the fuel is enabled) before the stack temperature Ts reaches the temperature at which oxidative degradation of the anode catalyst can occur. Therefore, in this case, it is possible to quickly complete the warm-up operation by controlling the second injector 37 to increase the fuel injection amount Fcomb.

In this embodiment, preferably, the stack warm-up degree Wst_e is the ratio of the stack temperature Ts acquired to the stack warm-up target temperature Ts_t being a warm-up target temperature of the fuel cell stack 10, and the reformer warm-up degree Wr_e is the ratio of the reformer temperature Tr acquired to the reformer warm-up target temperature Tr_t being a warm-up target temperature of the reformer 16.

By defining the stack warm-up degree Wst_e and the reformer warm-up degree Wr_e by the parameters in this way, it is possible to properly grasp the progress state of the warm-up of the fuel cell stack 10 and the progress state of the warm-up of the reformer 16 during the warm-up operation.

Further, in this embodiment, one aspect of a warm-up method performed by the fuel cell system S described above is provided.

Specifically, in this embodiment, there is provided a method for warming up the fuel cell system S, wherein the method includes: producing a heating gas by heating an off-gas discharged from the fuel cell stack 10 as a fuel cell that is supplied with fuel and air to generate electricity, and heating the reformer 16 that reforms the fuel to be supplied to the fuel cell stack 10 (the discharged gas combustor 12); and heating the fuel cell stack 10 using the heating gas.

In this warm-up method, the heating amount of the off-gas (the fuel injection amount Fcomb) and the heating amount of the air by the heating gas (the heat exchanger passing air flow rate qex) are adjusted based on the stack temperature Ts being the temperature of the fuel cell stack 10 and the reformer temperature Tr being the temperature of the reformer 16.

Consequently, the warm-up progress balance can be properly controlled according to the progress states of the warm-up of the fuel cell stack 10 and the warm-up of the reformer 16 based on the stack temperature Ts and the reformer temperature Tr. Therefore, it is possible to suppress the inconvenience such as the loss of heat resistance of the fuel cell stack 10 and the reformer 16, or the occurrence of oxidative degradation reactions in the anode electrode, which is caused by unbalance of the progress degrees of the warm-up of the fuel cell stack 10 and the warm-up of the reformer 16.

(First Modification)

Next, a first modification of the above-described embodiment will be described. The same symbols will be assigned to like elements as those in the above-described embodiment, thereby omitting a description thereof.

Figure 4:
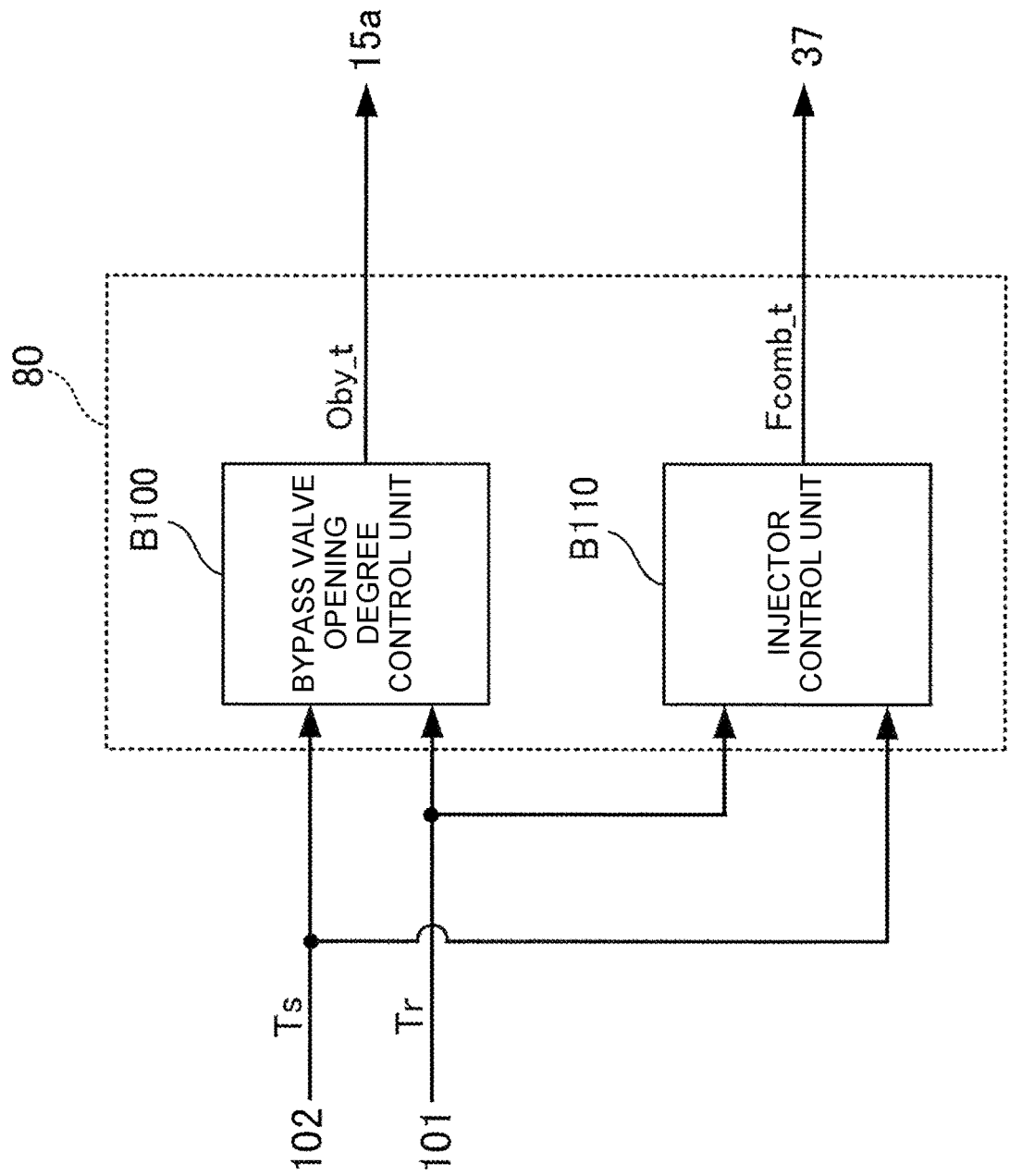
FIG. 4 is a block diagram for explaining a warm-up operation of the fuel cell system according to a first modification.

FIG. 4 is a block diagram for explaining the warm-up operation of the fuel cell system S in the first modification.

As illustrated, this modification differs from the above-described embodiment in that the injector control unit B110 of the controller 80 controls the second injector 37 based on the stack temperature Ts (the stack warm-up degree Wst_e) and the reformer temperature Tr (the reformer warm-up degree Wr_e). That is, the target bypass valve opening degree Oby_t is not referred to in the control of the injector control unit B110.

Also in the case of this modification, like in the first embodiment, the bypass valve opening degree control unit B100 operates the bypass valve 15a based on the stack warm-up degree Wst_e and the reformer warm-up degree Wr_e.

On the other hand, the injector control unit B110 calculates the target fuel injection amount Fcomb_t so that the reformer temperature Tr (the reformer warm-up degree Wr_e) and the stack temperature Ts (the stack warm-up degree Wst_e) respectively become desired values, and controls the opening degree of the second injector 37 based on the target fuel injection amount Fcomb_t.

Therefore, even with the configuration of this modification, like in the first embodiment, it is possible to properly perform the warm-up operation while considering the mutual progress balance of the warm-up of the fuel cell stack 10 and the warm-up of the reformer 16.

(Second Modification)

Next, a second modification of the above-described embodiment will be described. The same symbols will be assigned to like elements as those in the above-described embodiment, thereby omitting a description thereof.

Figure 5:
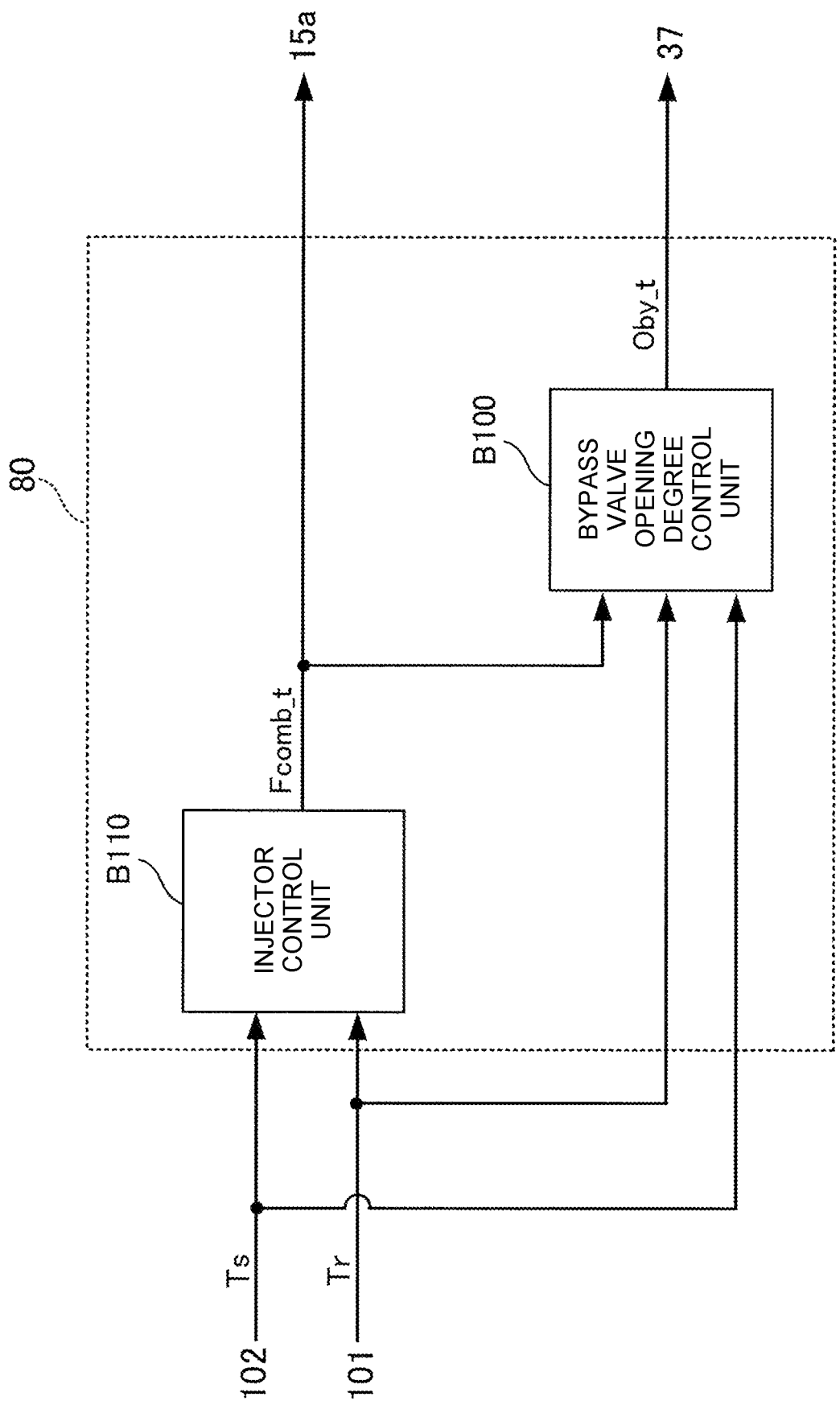
FIG. 5 is a block diagram for explaining a warm-up operation of the fuel cell system according to a second modification.

FIG. 5 is a block diagram for explaining the warm-up operation of the fuel cell system S in the second modification.

As illustrated, in this modification, the injector control unit B110 calculates the target fuel injection amount Fcomb_t so that the reformer temperature Tr (the reformer warm-up degree Wr_e) and the stack temperature Ts (the stack warm-up degree Wst_e) respectively become desired values, and controls the opening degree of the second injector 37 based on the target fuel injection amount Fcomb_t.

On the other hand, referring to the target fuel injection amount Fcomb_t calculated by the injector control unit B110, the bypass valve opening degree control unit B100 calculates the target bypass air flow rate qby_t, which does not cause a large deviation of the stack warm-up degree Wst_e from the reformer warm-up degree Wr_e, so that the reformer temperature Tr (the reformer warm-up degree Wr_e) and the stack temperature Ts (the stack warm-up degree Wst_e) respectively become desired values, and operates the bypass valve 15a based on the target bypass air flow rate qby_t.

Therefore, even with the configuration of this modification, like in the first embodiment, it is possible to properly perform the warm-up operation while considering the mutual progress balance of the warm-up of the fuel cell stack 10 and the warm-up of the reformer 16.

The above-described embodiment, the first modification, and the second modification are only examples of aspects of the present invention, and various changes can be made thereto within the scope of the present invention.

For example, the respective configurations of the fuel cell system S illustrated in FIG. 1 are only examples and are not intended to limit the configuration of the present invention thereto. Specifically, the configuration of the heat source device (the discharged gas combustor 12, the combustor fuel supply passage 36, and the second injector 37) can be replaced as appropriate by an arbitrary device that can adjust the calorific value to be produced, such as a heater that can adjust the output, or another combustor that can adjust the supply amount of fuel.

The configuration of the fuel cell heating device (the air heat exchanger 14, the bypass passage 15, and the bypass valve 15a) can be replaced as appropriate by an arbitrary device that can adjust the heating amount while heating air to be supplied to the fuel cell stack 10 using a heating gas from the heat source device. For example, instead of the configuration employing the bypass passage 15 and the bypass valve 15a, the air flow rate that is supplied to the air heat exchanger 14 (the heating amount of the fuel cell stack 10) may be adjusted by properly changing the output of the air pump 38 in FIG. 1. Alternatively, an air supply device such as a pump that supplies air to the air heat exchanger 14 may be separately provided, and the air flow rate that is supplied to the air heat exchanger 14 may be adjusted by controlling the output of this air supply device.

Further, instead of using the air electrode inlet temperature of the fuel cell stack 10 as "the stack temperature Ts" as described above, the stack air electrode outlet temperature Tsc_o being the air electrode outlet temperature of the fuel cell stack 10 or the average value of the air electrode inlet temperature and the air electrode outlet temperature may be used as "the stack temperature Ts". In particular, in the situation where the warm-up of the fuel cell stack 10 has progressed to some degree so that the heat loss of air in the fuel cell stack 10 is low, or the like, setting "the stack temperature Ts" by taking into account the air electrode outlet temperature in addition to the air electrode inlet temperature makes it possible to improve the accuracy of control in the warm-up operation using such a "stack temperature Ts".

Further, the parameters that indicate "the stack warm-up degree Wst_e" and "the reformer warm-up degree Wr_e" are not necessarily limited to those in the above-described embodiment and modifications. It is possible to employ other arbitrary parameters that can indicate the progress degree of the warm-up of the fuel cell stack 10 and the progress degree of the warm-up of the reformer 16.

Second Embodiment

Figure 6:
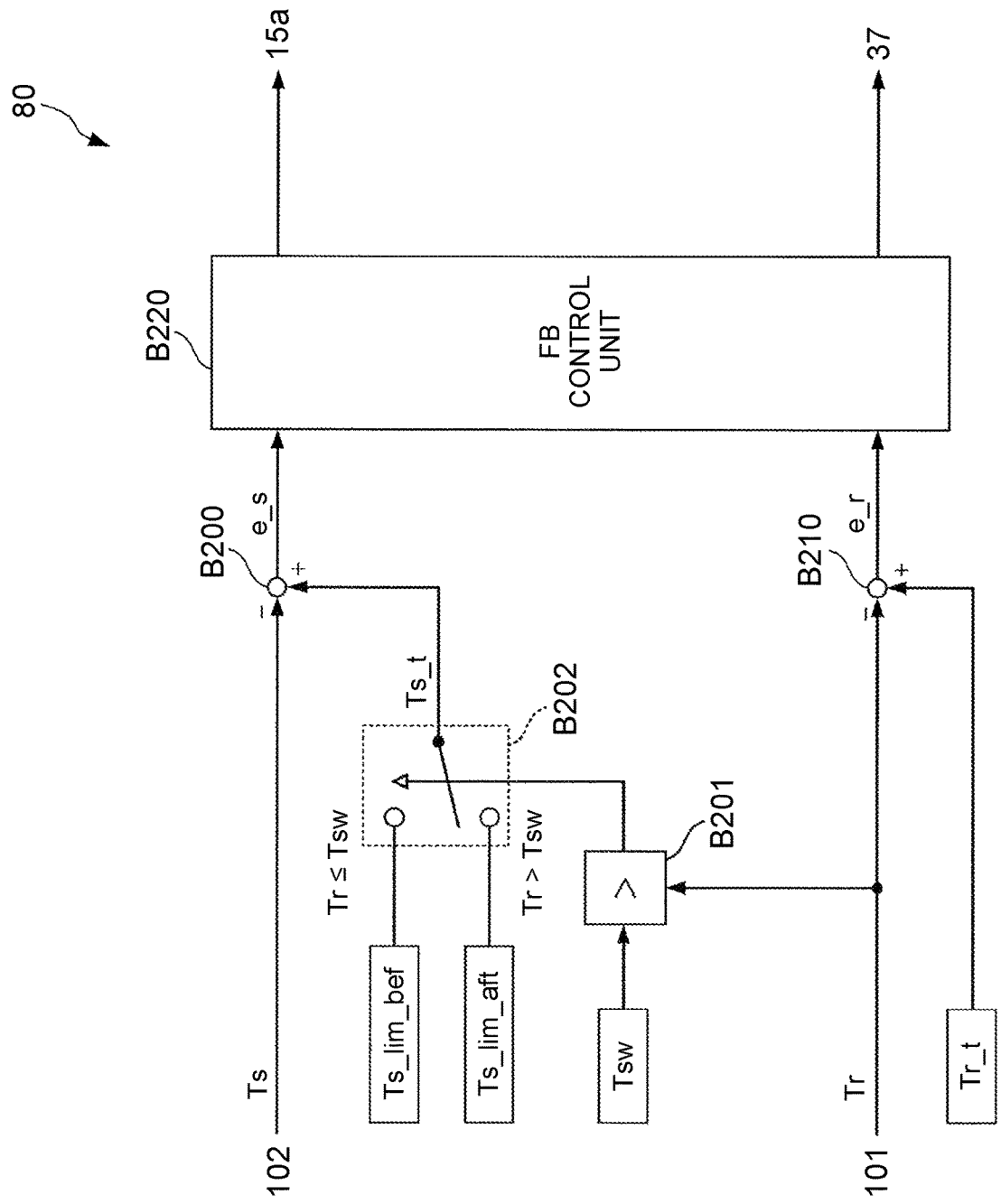
FIG. 6 is a block diagram for explaining a warm-up operation of a fuel cell system according to a second embodiment.

FIG. 6 is a block diagram for explaining a warm-up operation of the fuel cell system S in this embodiment. The functions of calculation units illustrated in this block diagram are realized by the hardware and software (programs) forming the controller 80.

As illustrated, the controller 80 of this embodiment includes a stack temperature deviation calculation unit B200, a reformer temperature deviation calculation unit B210, and a feedback control unit B220.

The stack temperature deviation calculation unit B200 subtracts the stack temperature Ts from the stack warm-up target temperature Ts_t to calculate a stack temperature deviation e_s. That is, e_s=Ts_t−Ts. Since the stack temperature deviation e_s is one aspect of a parameter indicating a ratio of the stack temperature Ts to the stack warm-up target temperature Ts_t, the stack temperature deviation e_s is "the stack warm-up degree Wst_e" in this embodiment.

In this embodiment, the controller 80 changes the stack warm-up target temperature Ts_t during the warm-up operation according to the state of the fuel cell system S. In particular, in this embodiment, the controller 80 changes the stack warm-up target temperature Ts_t according to the magnitude of the reformer temperature Tr acquired.

Specifically, the controller 80 includes a reformer temperature determination unit B201 and a target temperature switching unit B202 as a configuration for changing the stack warm-up target temperature Ts_t.

The reformer temperature determination unit B201 determines whether or not the reformer temperature Tr acquired is greater than a predetermined switching temperature Tsw. Herein, the switching temperature Tsw is a temperature (e.g. 500° C.) indicating that the warm-up of the reformer 16 has progressed to a certain degree. That is, the switching temperature Tsw is determined in terms of whether or not the stack warm-up degree Wst_e is lower than the reformer warm-up degree Wr_e by a certain value or more.

In particular, in this embodiment, the switching temperature Tsw is set to a temperature at which reforming of fuel is enabled in the reformer 16, i.e. a temperature at which fuel supply to the fuel cell stack 10 by the first injector 30 in FIG. 1 can be started.

Then, the reformer temperature determination unit B201 outputs to the target temperature switching unit B202 a signal indicating a determination result of whether or not the reformer temperature Tr is greater than the switching temperature Tsw.

The target temperature switching unit B202 receives the signal indicating the determination result from the reformer temperature determination unit B201.

Then, when the reformer temperature Tr is smaller than (or equal to or smaller than) the switching temperature Tsw, the target temperature switching unit B202 outputs a before-fuel-supply stack target temperature Ts_lim_bef as the stack warm-up target temperature Ts_t to the stack temperature deviation calculation unit B200.

On the other hand, when the reformer temperature Tr is greater than (or equal to or greater than) the switching temperature Tsw, the target temperature switching unit B202 outputs an after-fuel-supply stack target temperature Ts_lim_aft as the stack warm-up target temperature Ts_t to the stack temperature deviation calculation unit B200.

The before-fuel-supply stack target temperature Ts_lim_bef is a target value that is determined on the assumption that fuel supply to the fuel cell stack 10 (the reformer 16) is not started. Before the fuel supply to the fuel cell stack 10 is started, in terms of the heat resistant protection of the fuel cell stack 10, it is preferable to limit the difference between an air electrode inlet temperature of the fuel cell stack 10 (the stack temperature Ts in this embodiment) and an air electrode outlet temperature of the fuel cell stack 10 (the stack air electrode outlet temperature Tsc_o) to a predetermined value or less (e.g. 300° C. or less). Therefore, the before-fuel-supply stack target temperature Ts_lim_bef is properly set in terms of the heat resistant protection of the fuel cell stack 10 and so on.

On the other hand, the after-fuel-supply stack target temperature Ts_lim_aft is a target value that is determined on the assumption that fuel supply to the fuel cell stack 10 (the reformer 16) has started. After the fuel supply to the fuel cell stack 10 has started, since the warm-up of the reformer 16 has progressed to some degree as described above, it is preferable to increase the warm-up speed of the fuel cell stack 10 in terms of completing the warm-up operation as quickly as possible. In this situation, since reforming of fuel in the reformer 16 is enabled so that a fuel gas is supplied into the anode electrode of the fuel cell stack 10, the inside of the anode electrode is maintained in a reducing atmosphere. Therefore, even when the temperature of the fuel cell stack 10 is increased, the occurrence of undesirable oxidation reactions (oxidation reactions of the nickel catalyst, etc.) in the anode electrode is suppressed. Taking into account such a situation, the after-fuel-supply stack target temperature Ts_lim_aft is set to a value higher than the before-fuel-supply stack target temperature Ts_lim_bef, particularly to a temperature at which the warm-up of the fuel cell stack 10 should be completed.

On the other hand, the reformer temperature deviation calculation unit B210 subtracts the reformer temperature Tr from the reformer warm-up target temperature Tr_t to calculate a reformer temperature deviation e_r. That is, e_r=Tr_t−Tr. Since the reformer temperature deviation e_r of this embodiment is one aspect of a parameter indicating a ratio of the reformer temperature Tr acquired to the reformer warm-up target temperature Tr_t, the reformer temperature deviation e_r is "the reformer warm-up degree Wr_e" in this embodiment.

Then, the feedback control unit B220 receives the stack temperature deviation e_s from the stack temperature deviation calculation unit B200 and the reformer temperature deviation e_r from the reformer temperature deviation calculation unit B210. The feedback control unit B220 controls the bypass valve 15a and the second injector 37 based on the stack temperature deviation e_s and the reformer temperature deviation e_r.

Figure 7:
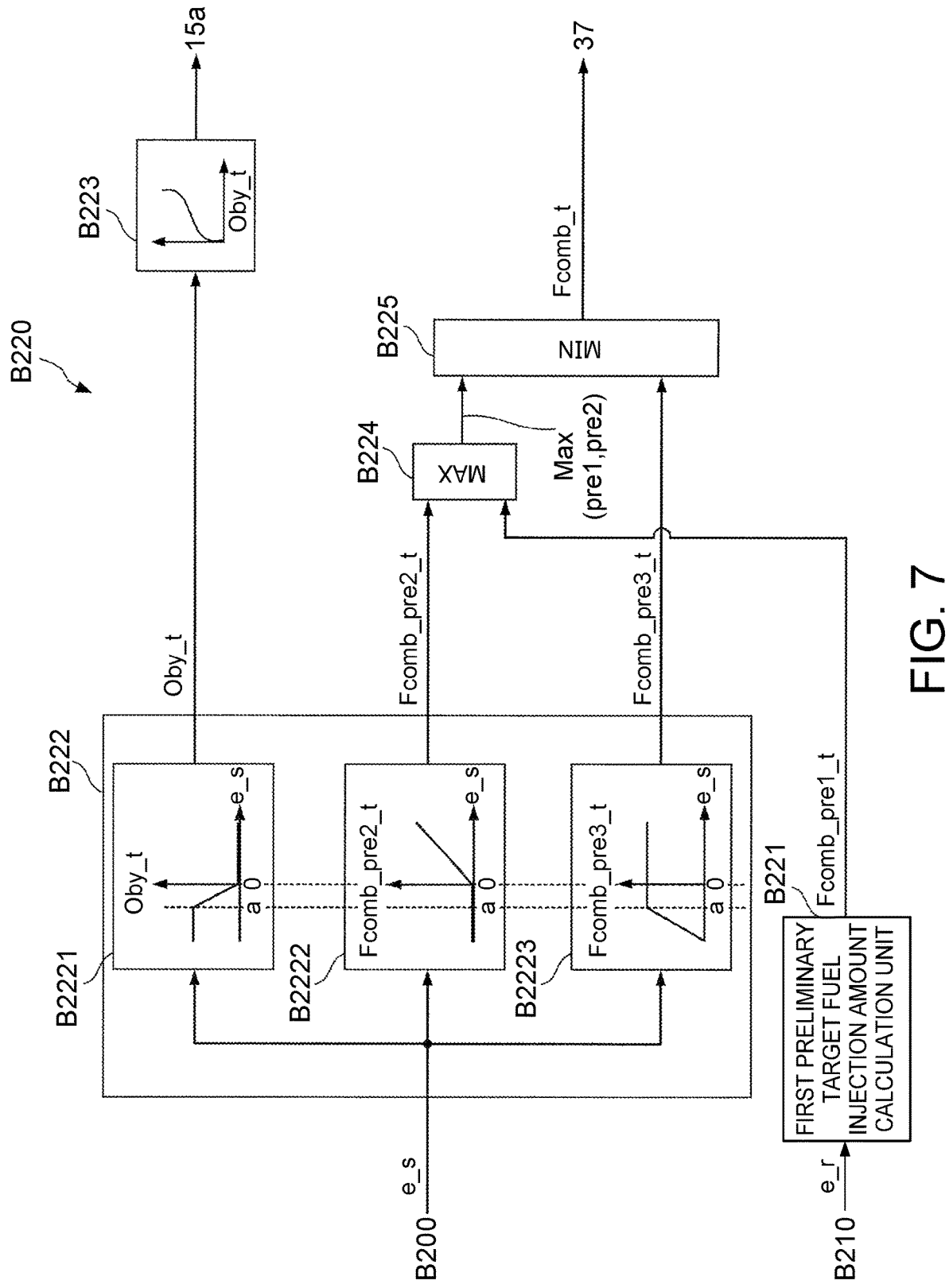
FIG. 7 is a block diagram for explaining details of control in a feedback control unit according to the second embodiment.

FIG. 7 is a block diagram for explaining details of the control in the feedback control unit B220.

As illustrated, the feedback control unit B220 includes a first preliminary target fuel injection amount calculation unit B221, a basic control parameter calculation unit B222, a bypass valve operating unit B223, a maximum selection unit B224, and a minimum selection unit B225.

The first preliminary target fuel injection amount calculation unit B221 receives the reformer temperature deviation e_r calculated by the reformer temperature deviation calculation unit B210. Based on the reformer temperature deviation e_r, the first preliminary target fuel injection amount calculation unit B221 calculates a first preliminary target fuel injection amount Fcomb_pre1_t being a preliminary target value of the fuel injection amount Fcomb (corresponding to the opening degree of the second injector 37) in terms of the warm-up of the reformer 16.

Specifically, the first preliminary target fuel injection amount calculation unit B221 calculates the first preliminary target fuel injection amount Fcomb_pre1_t so that the fuel injection amount Fcomb is controlled in a direction to decrease as the reformer temperature deviation e_r approaches zero. Then, the first preliminary target fuel injection amount calculation unit B221 outputs the calculated first preliminary target fuel injection amount Fcomb_pre1_t to the maximum selection unit B224.

On the other hand, the basic control parameter calculation unit B222 includes a bypass valve opening degree calculation unit B2221, a second preliminary target fuel injection amount calculation unit B2222, and a third preliminary target fuel injection amount calculation unit B2223.

The bypass valve opening degree calculation unit B2221 receives the stack temperature deviation e_s calculated by the stack temperature deviation calculation unit B200. The bypass valve opening degree calculation unit B2221 calculates the target bypass valve opening degree Oby_t of the bypass valve 15a based on the stack temperature deviation e_s.

Specifically, the bypass valve opening degree calculation unit B2221 calculates the target bypass valve opening degree Oby_t from the stack temperature deviation e_s based on a graph illustrated in the figure. Herein, in the graph in the figure, when the stack temperature deviation e_s≥0 (Ts_t−Ts≥0), the warm-up of the fuel cell stack 10 has not reached the target, and therefore, the bypass valve opening degree calculation unit B2221 prevents air in the main air supply passage 24 illustrated in FIG. 1 from bypassing the air heat exchanger 14 and causes all the air to pass through the air heat exchanger 14. That is, the opening degree of the bypass valve 15a is set to zero (fully closed) to promote the warm-up of the fuel cell stack 10 by heating the air to be supplied to the fuel cell stack 10 by the air heat exchanger 14 as much as possible.

In the graph in the figure, when the stack temperature deviation e_s<0 (Ts_t−Ts<0), the warm-up of the fuel cell stack 10 has reached the target. Therefore, in this case, in order to suppress the heating amount of the fuel cell stack 10, as the stack temperature deviation e_s decreases, the air flow rate that bypasses the air heat exchanger 14 is increased (the heat exchanger passing air flow rate qex is reduced). That is, the target bypass valve opening degree Oby_t is calculated to increase the opening degree of the bypass valve 15a as the stack temperature deviation e_s decreases.

In the graph in the figure, when the stack temperature deviation e_s is in a region where it is equal to or less than a predetermined value a, the opening degree of the bypass valve 15a is fully open. That is, the opening degree of the bypass valve 15a cannot be increased further, and therefore, when suppressing the heating rate of the fuel cell stack 10 in this state, it is necessary to perform control to reduce the fuel injection amount Fcomb as appropriate. This will be described later.

Further, the bypass valve opening degree calculation unit B2221 outputs the calculated target bypass valve opening degree Oby_t to the bypass valve operating unit B223.

Next, the second preliminary target fuel injection amount calculation unit B2222 receives the stack temperature deviation e_s calculated by the stack temperature deviation calculation unit B200. Based on the stack temperature deviation e_s, the second preliminary target fuel injection amount calculation unit B2222 calculates a second preliminary target fuel injection amount Fcomb_pre2_t being a preliminary target value of the fuel injection amount Fcomb in terms of maintaining the heating amount of the fuel cell stack 10 at a certain value or more according to the stack warm-up degree Wst_e.

Specifically, the second preliminary target fuel injection amount calculation unit B2222 calculates the second preliminary target fuel injection amount Fcomb_pre2_t from the stack temperature deviation e_s based on a graph illustrated in the figure. Herein, in the graph in the figure, when the stack temperature deviation e_s≥0 where the warm-up of the fuel cell stack 10 has not reached the target, the second preliminary target fuel injection amount calculation unit B2222 calculates the second preliminary target fuel injection amount Fcomb_pre2_t so as to reduce the fuel injection amount Fcomb as the stack temperature deviation e_s decreases. Consequently, the calorific value of a combustion gas that is produced in the discharged gas combustor 12 can be adjusted to maintain the warm-up speed of the fuel cell stack 10 at a certain value or more according to an increase of the stack temperature Ts.

In the graph in the figure, when the stack temperature deviation e_s<0 (Ts_t−Ts<0) where the stack temperature Ts has reached the target, the second preliminary target fuel injection amount Fcomb_pre2_t is set to zero.

Further, the second preliminary target fuel injection amount calculation unit B2222 outputs the calculated second preliminary target fuel injection amount Fcomb_pre2_t to the maximum selection unit B224.

Next, the third preliminary target fuel injection amount calculation unit B2223 receives the stack temperature deviation e_s calculated by the stack temperature deviation calculation unit B200. Based on the stack temperature deviation e_s, the third preliminary target fuel injection amount calculation unit B2223 calculates a third preliminary target fuel injection amount Fcomb_pre3_t being a preliminary target value of the fuel injection amount Fcomb in terms of quickly completing the warm-up of the fuel cell stack 10 and the warm-up of the reformer 16.

Specifically, the third preliminary target fuel injection amount calculation unit B2223 calculates the third preliminary target fuel injection amount Fcomb_pre3_t from the stack temperature deviation e_s based on a graph illustrated in the figure. Herein, in the graph in the figure, until the stack temperature deviation e_s=a where the opening degree of the bypass valve 15a is fully open, i.e. until the stack temperature Ts becomes greater than the stack warm-up target temperature Ts_t by the predetermined value a or more, the third preliminary target fuel injection amount calculation unit B2223 calculates the third preliminary target fuel injection amount Fcomb_pre3_t so that the fuel injection amount Fcomb becomes a desired value by adjusting the opening degree of the second injector 37.

Therefore, as the third preliminary target fuel injection amount Fcomb_pre3_t, as illustrated in the graph in the figure, basically, the fuel injection amount Fcomb is set that corresponds to a proper opening degree of the second injector 37 that is determined in terms of performing the warm-up of the fuel cell stack 10 and the warm-up of the reformer 16 at proper rates.

On the other hand, as in the control by the bypass valve opening degree calculation unit B2221 described above, when the stack temperature deviation e_s becomes the predetermined value a or less, the opening degree of the bypass valve 15a cannot be increased so that it is not possible to increase the air flow rate that bypasses the air heat exchanger 14.

Therefore, in this embodiment, the third preliminary target fuel injection amount calculation unit B2223 calculates the third preliminary target fuel injection amount Fcomb_pre3_t so as to reduce the fuel injection amount Fcomb as the stack temperature deviation e_s decreases in a region where the stack temperature deviation e_s is the predetermined value a or less. That is, in the situation where the heating rate of the fuel cell stack 10 cannot be adjusted by the change in the opening degree of the bypass valve 15a, the third preliminary target fuel injection amount Fcomb_pre3_t is calculated to limit the fuel injection amount Fcomb according to an increase of the stack temperature Ts.

Further, the third preliminary target fuel injection amount calculation unit B2223 outputs the calculated third preliminary target fuel injection amount Fcomb_pre3_t to the minimum selection unit B225.

Next, the bypass valve operating unit B223 receives the target bypass valve opening degree Oby_t calculated by the bypass valve opening degree calculation unit B2221. Then, the bypass valve operating unit B223 calculates a target rotation angle of a non-illustrated step motor of the bypass valve 15a from a map illustrated in the figure based on the target bypass valve opening degree Oby_t and operates the bypass valve 15a so that a rotation angle of the step motor approaches the target rotation angle.

Next, the maximum selection unit B224 receives the first preliminary target fuel injection amount Fcomb_pre1_t from the first preliminary target fuel injection amount calculation unit B221 and receives the second preliminary target fuel injection amount Fcomb_pre2_t from the second preliminary target fuel injection amount calculation unit B2222.

The maximum selection unit B224 outputs Max (pre1, pre2), which is greater between the first preliminary target fuel injection amount Fcomb_pre1_t and the second preliminary target fuel injection amount Fcomb_pre2_t, to the minimum selection unit B225.

That is, the maximum selection unit B224 selects a greater value between the first preliminary target fuel injection amount Fcomb_pre1_t that is determined in terms of maintaining the warm-up speed of the reformer 16 at a certain value or more, and the second preliminary target fuel injection amount Fcomb_pre2_t that is determined in terms of maintaining the warm-up speed of the fuel cell stack 10 at a certain value or more. Therefore, when Max (pre1, pre2) is set as the target fuel injection amount Fcomb_t, the warm-up speed of both the fuel cell stack 10 and the reformer 16 can be maintained at certain values or more.

Next, the minimum selection unit B225 receives Max (pre1, pre2) from the maximum selection unit B224 and the third preliminary target fuel injection amount Fcomb_pre3_t from the third preliminary target fuel injection amount calculation unit B2223.

The minimum selection unit B225 selects a smaller value between Max (pre1, pre2) and the third preliminary target fuel injection amount Fcomb_pre3_t as the final target fuel injection amount Fcomb_t.

That is, the minimum selection unit B225 sets, as the final target fuel injection amount Fcomb_t, a smaller value between Max (pre1, pre2) that is determined in terms of maintaining the warm-up speeds of both the fuel cell stack 10 and the reformer 16 at certain values or more, and the third preliminary target fuel injection amount Fcomb_pre3_t that is determined in terms of the adjustment of the heating rate of the fuel cell stack 10 after the opening degree of the bypass valve 15a becomes fully open (the stack temperature deviation e_s=α).

Therefore, until the bypass valve 15a is fully opened, the fuel injection amount Fcomb is controlled in terms of maintaining the warm-up speeds of both the fuel cell stack 10 and the reformer 16. On the other hand, after the stack temperature Ts exceeds the stack warm-up target temperature Ts_t so that the bypass valve 15a is fully opened (region of the stack temperature deviation e_s≤α), the fuel injection amount Fcomb is controlled to suppress an increase of the stack temperature Ts.

Hereinafter, one aspect of the temporal flow in the warm-up operation of the fuel cell system S described in FIGS. 6 and 7 will be described.

Figure 8:
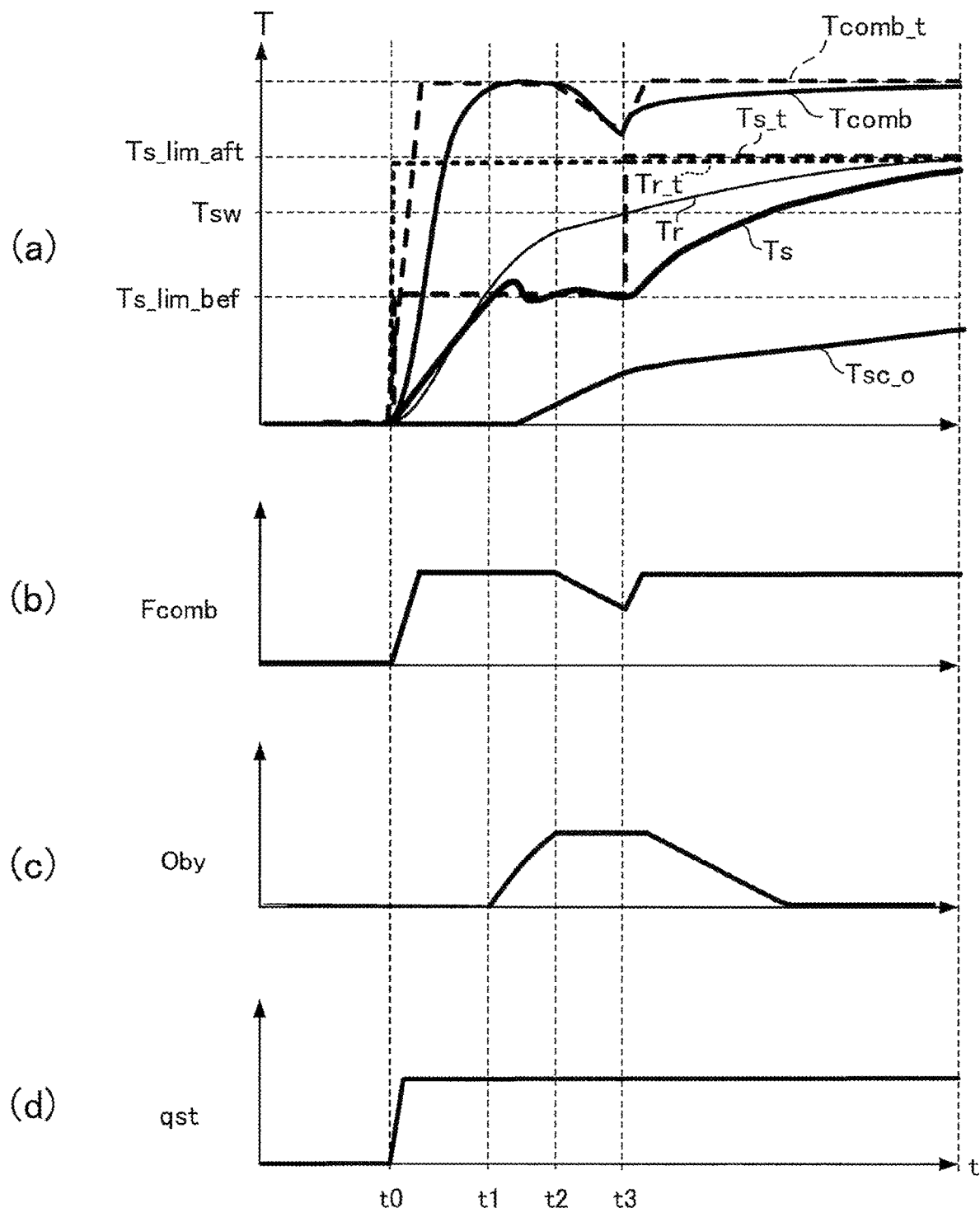
FIG. 8 is a time chart illustrating one example of the temporal flow of the warm-up operation according to the second embodiment.

FIG. 8 is a time chart illustrating one example of the temporal flow of the warm-up operation of this embodiment. FIG. 8(a) illustrates the temporal changes of the temperature of the discharged gas combustor 12 (a discharged gas combustor temperature Tcomb), the reformer temperature Tr, the stack temperature Ts, and the stack air electrode outlet temperature Tsc_o during the warm-up operation. Herein, "Tcomb_t" in FIG. 8(a) is a target value of the discharged gas combustor temperature Tcomb of the discharged gas combustor 12. The target discharged gas combustor temperature Tcomb_t is properly determined based on, for example, the stack warm-up target temperature Ts_t, the reformer warm-up target temperature Tr_t, and so on.

As the discharged gas combustor temperature Tcomb, use is made of, for example, a detected value of a non-illustrated temperature sensor provided in the combustion gas passage 40 downstream of the evaporator 32 or the like, or a value obtained by correcting the detected value as appropriate.

Further, FIG. 8(b) illustrates the temporal change of the fuel injection amount Fcomb during the warm-up operation. FIG. 8(c) illustrates the temporal change of the bypass valve opening degree Oby during the warm-up operation. FIG. 8(d) illustrates the temporal change of the stack supply air flow rate qst during the warm-up operation.

As illustrated, at time t0, the controller 80 starts the warm-up operation in response to an operation of the predetermined SOFC start switch or the like.

Specifically, the controller 80 sets the stack warm-up target temperature Ts_t to the before-fuel-supply stack target temperature Ts_lim_bef according to the control logic of the reformer temperature determination unit B201 and the target temperature switching unit B202 in FIG. 6. Then, the stack temperature deviation e_s (Ts_lim_bef−Ts) based on the before-fuel-supply stack target temperature Ts_lim_bef is applied to the control logic illustrated in FIG. 7 so that the respective controls are performed.

At time t1, when the stack temperature Ts has reached the before-fuel-supply stack target temperature Ts_lim_bef being a target value before the fuel supply (see FIG. 8(a)), the controller 80 starts control of the bypass valve 15a according to the control logic of the bypass valve opening degree calculation unit B2221 in FIG. 7 (see FIG. 8(c)). That is, the controller 80 increases the bypass valve opening degree Oby as the warm-up progresses so that the stack temperature deviation e_s decreases. Consequently, the temperature rise of the fuel cell stack 10 is suppressed.

At time t2, when the bypass valve 15a is fully opened (see FIG. 8(c)), the controller 80 limits the target value of the fuel injection amount Fcomb to the third preliminary target fuel injection amount Fcomb_pre3_t according to the control logic of the third preliminary target fuel injection amount calculation unit B2223 and the minimum selection unit B225 in FIG. 7. That is, since it is not possible to suppress the heating of the fuel cell stack 10 by further increasing the bypass valve opening degree Oby, the fuel injection amount Fcomb is limited so as to suppress the heating rate of the fuel cell stack 10.

At time t3, when the reformer temperature Tr has reached the switching temperature Tsw, the controller 80 switches the stack warm-up target temperature Ts_t from the before-fuel-supply stack target temperature Ts_lim_bef to the after-fuel-supply stack target temperature Ts_lim_aft (see FIG. 8(a)).

Consequently, the rising rate of the stack temperature Ts is improved according to the control logic of the first preliminary target fuel injection amount calculation unit B221 and the second preliminary target fuel injection amount calculation unit B2222 (see FIG. 8(a)). Further, the fuel injection amount Fcomb is increased according to the control logic of the second preliminary target fuel injection amount calculation unit B2222 (see FIG. 8(b)), and the bypass valve opening degree Oby is reduced according to the control logic of the bypass valve opening degree calculation unit B2221 (see FIG. 8(c)).

Thereafter, as illustrated in FIG. 8(a), the reformer temperature Tr and the stack temperature Ts respectively approach their target values, i.e. the reformer warm-up target temperature Tr_t and the stack warm-up target temperature Ts_t.

According to the fuel cell system S of this embodiment described above, the following operations and effects are exhibited in addition to the operations and effects described in the first embodiment.

In the fuel cell system S of this embodiment, the controller 80 limits an increase in the calorific value of a heating gas when an amount of air for heat exchange with a combustion gas being the heating gas has reached a predetermined lower limit value. That is, when the stack temperature deviation e_s becomes the predetermined value a or less, the fuel injection amount Fcomb is limited (see the third preliminary target fuel injection amount calculation unit B2223 in FIG. 7).

Consequently, in the region where the stack temperature deviation e_s is the predetermined value a or less so that the opening degree of the bypass valve 15a becomes fully open, i.e. in the situation where the heating rate of the fuel cell stack 10 cannot be further suppressed by the control of the bypass valve 15a, it is possible to suppress the heating rate of the fuel cell stack 10 by limiting the fuel injection amount Fcomb.

Therefore, for example, in the state where the reformer warm-up degree Wr_e is low so that reforming of fuel in the reformer 16 is not ready to start and thus it is not possible to sufficiently supply a fuel gas to the fuel cell stack 10, it is possible to suppress the warm-up speed of the fuel cell stack 10. That is, in such a state, it is possible to suppress the temperature rise of the fuel cell stack 10, thereby suppressing oxidative degradation reactions in the anode electrode described above.

While the embodiments of the present invention have been described above, the above-described embodiments only show part of application examples of the present invention and are not intended to limit the technical scope of the present invention to the specific configurations of the above-described embodiments. Various modifications and alterations can be made to the above-described embodiments within the scope of the matter recited in the claims.

For example, in the above-described embodiments and modifications, in the warm-up operation to perform the warm-up of the fuel cell stack 10 and the warm-up of the reformer 16, the balance between the reformer warm-up degree Wr_e and the stack warm-up degree Wst_e is adjusted based on the reformer temperature Tr and the stack temperature Ts.

However, in the warm-up operation to perform also the warm-up of the evaporator 32 in addition to the warm-up of the fuel cell stack 10 and the warm-up of the reformer 16, the mutual warm-up balance of them may be controlled based on the stack temperature Ts, the reformer temperature Tr, and the temperature of the evaporator 32 (hereinafter referred to as an "evaporator temperature Tv").

Figure 9:
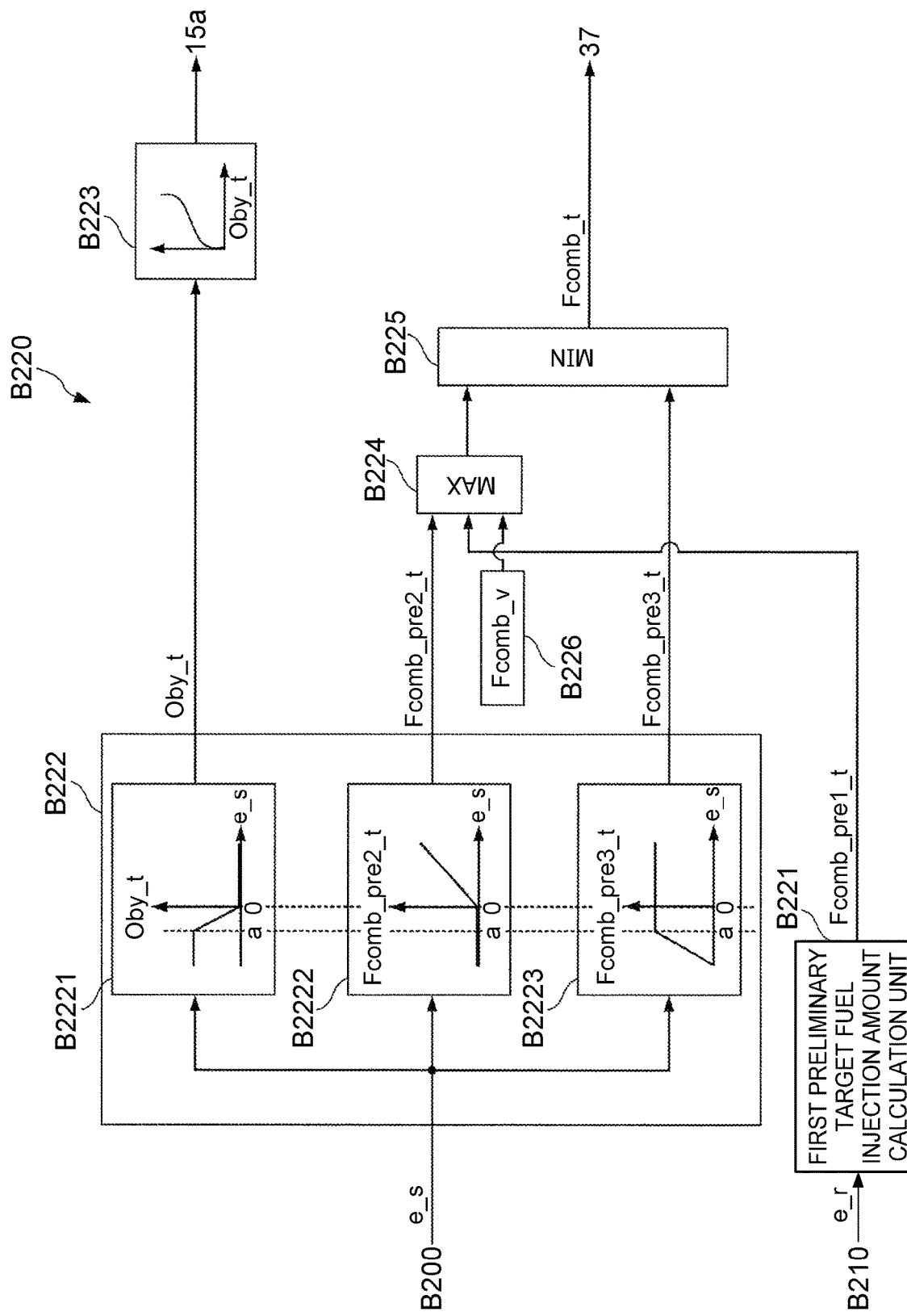
FIG. 9 is a block diagram for explaining another aspect of the feedback control unit according to the second embodiment.

For example, instead of the control logic based on the block diagram of FIG. 7 described in the second embodiment, the control logic based on a block diagram illustrated in FIG. 9 may be employed. Specifically, in FIG. 9, in addition to the configuration of the block diagram of FIG. 7, an evaporator request fuel injection amount Fcomb_v being a fuel injection amount that is determined according to the warm-up degree of the evaporator 32 in the warm-up operation based on the evaporator temperature Tv in the warm-up operation is input to the maximum selection unit B224.

Consequently, the maximum value, among the first preliminary target fuel injection amount Fcomb_pre1_t that is determined in terms of the warm-up of the reformer 16, the second preliminary target fuel injection amount Fcomb_pre2_t that is determined in terms of the warm-up of the fuel cell stack 10, and the evaporator request fuel injection amount Fcomb_v, from the maximum selection unit B224 is used for adjustment of the fuel injection amount Fcomb through the process of the minimum selection unit B225. That is, it is possible to adjust the fuel injection amount Fcomb based on the warm-up degree of the fuel cell stack 10, the warm-up degree of the reformer 16, and the warm-up degree of the evaporator 32.

The invention claimed is:

1. A fuel cell system comprising:
   a fuel cell configured to be supplied with fuel and air to generate electricity;
   a reformer configured to reform the fuel to be supplied to the fuel cell;
   a heat source device configured to heat an off-gas discharged from the fuel cell to produce a heating gas and configured to heat the reformer;
   a fuel cell heating device configured to heat the air to be supplied to the fuel cell using the heating gas;
   a fuel cell temperature acquisition unit configured to acquire a temperature of the fuel cell;
   a reformer temperature acquisition unit configured to acquire a temperature of the reformer; and
   a controller configured to, in a warm-up operation to perform a warm-up of the reformer and a warm-up of the fuel cell, control at least one of the heat source device or the fuel cell heating device based on the temperature of the reformer and the temperature of the fuel cell to adjust at least one of a heating amount of the off-gas or a heating amount of the air by the heating gas,
   wherein the controller is configured to reduce the heating amount of the air by the heating gas to control a warm-up progress balance according to progress states of the warm-up of the reformer and the warm-up of the fuel cell when a warm-up degree of the fuel cell based on the temperature of the fuel cell is greater than a warm-up degree of the reformer based on the temperature of the reformer, the warm-up degree of the fuel cell being a ratio of the temperature of the fuel cell acquired by the fuel cell temperature acquisition unit to a warm-up target temperature of the fuel cell, and the warm-up degree of the reformer being a ratio of the temperature of the reformer acquired by the reformer temperature acquisition unit to a warm-up target temperature of the reformer.

2. The fuel cell system according to claim 1, wherein:
   the fuel cell heating device includes an air heat exchanger provided to an air supply passage configured to supply the air to the fuel cell, the air heat exchanger configured to perform heat exchange of the air in the air supply passage with the heating gas, a bypass passage provided to the air supply passage to bypass the air heat exchanger, and a bypass valve provided in the bypass passage; and
   the controller is configured to control an opening degree of the bypass valve to adjust an air flow rate to be supplied to the air heat exchanger.

3. The fuel cell system according to claim 1, wherein:
   the heat source device includes a discharged gas combustor configured to produce a combustion gas as the heating gas by burning the off-gas, and a fuel supply amount adjustment unit configured to adjust an amount of the fuel to be supplied to the discharged gas combustor; and
   the controller is configured to control the fuel supply amount adjustment unit to adjust a fuel supply amount to the discharged gas combustor.

4. The fuel cell system according to claim 3, further comprising:
   a raw fuel tank storing raw fuel;
   a combustor fuel supply passage configured to supply the fuel from the raw fuel tank to the discharged gas combustor; and
   a combustion gas supply passage configured to supply the combustion gas produced in the discharged gas combustor to the fuel cell heating device,
   wherein:
   the heat source device includes an injector provided in the combustor fuel supply passage; and
   the controller is configured to control the injector to adjust the fuel supply amount to the discharged gas combustor.

5. The fuel cell system according to claim 1, wherein:
   the fuel cell heating device includes an air heat exchanger configured to heat the air by performing a heat exchange with the heating gas, a bypass passage configured to supply a part of the air to the fuel cell, the part of the air bypassing the air heat exchanger through the bypass passage, and a bypass valve in the bypass passage;
   a target bypass valve opening degree of the bypass valve is calculated to increase an opening degree of the bypass valve as a temperature deviation between the temperature of the fuel cell and the warm-up target temperature of the fuel cell decreases; and the controller is configured to limit an increase of the heating amount of the off-gas when the temperature deviation becomes a predetermined value or less, the predetermined value being a value where the opening degree of the bypass valve is fully open.

6. A fuel cell system comprising:

a fuel cell configured to be supplied with fuel and air to generate electricity;

a reformer configured to reform the fuel to be supplied to the fuel cell;

a heat source device configured to heat an off-gas discharged from the fuel cell to produce a heating gas and configured to heat the reformer;

a fuel cell heating device configured to heat the air to be supplied to the fuel cell using the heating gas;

a fuel cell temperature acquisition unit configured to acquire a temperature of the fuel cell;

a reformer temperature acquisition unit configured to acquire a temperature of the reformer; and a controller configured to, in a warm-up operation to perform a warm-up of the reformer and a warm-up of the fuel cell, control at least one of the heat source device or the fuel cell heating device based on the temperature of the reformer and the temperature of the fuel cell to adjust at least one of a heating amount of the off-gas or a heating amount of the air by the heating gas, wherein the controller is configured to increase the heating amount of the off-gas to control a warm-up progress balance according to progress states of the warm-up of the reformer and the warm-up of the fuel cell when a warm-up degree of the reformer based on the temperature of the reformer is greater than a warm-up degree of the fuel cell based on the temperature of the fuel cell, the warm-up degree of the fuel cell being a ratio of the temperature of the fuel cell acquired by the fuel cell temperature acquisition unit to a warm-up target temperature of the fuel cell, and the warm-up degree of the reformer being a ratio of the temperature of the reformer acquired by the reformer temperature acquisition unit to a warm-up target temperature of the reformer.

7. A method for warming up a fuel cell system, the method comprising:

producing a heating gas by heating an off-gas discharged from a fuel cell configured to be supplied with fuel and air to generate electricity, and heating a reformer configured to reform the fuel to be supplied to the fuel cell;

acquiring a temperature of the fuel cell and a temperature of the reformer; and heating the fuel cell using the heating gas, wherein:

at least one of a heating amount of the off-gas or a heating amount of the air by the heating gas is adjusted based on the temperature of the fuel cell and the temperature of the reformer; and the heating amount of the air by the heating gas is reduced and a warm-up progress balance according to progress states of warm-up of the reformer and warm-up of the fuel cell is thereby controlled when a warm-up degree of the fuel cell based on the temperature of the fuel cell is greater than a warm-up degree of the reformer based on the temperature of the reformer, the warm-up degree of the fuel cell being a ratio of the temperature of the fuel cell acquired to a warm-up target temperature of the fuel cell, and the warm-up degree of the reformer being a ratio of the temperature of the reformer acquired to a warm-up target temperature of the reformer.

8. A method for warming up a fuel cell system, the method comprising:

producing a heating gas by heating an off-gas discharged from a fuel cell configured to be supplied with fuel and air to generate electricity, and heating a reformer configured to reform the fuel to be supplied to the fuel cell;

acquiring a temperature of the fuel cell and a temperature of the reformer; and heating the fuel cell using the heating gas, wherein:

at least one of a heating amount of the off-gas or a heating amount of the air by the heating gas is adjusted based on the temperature of the fuel cell and the temperature of the reformer; and the heating amount of the off-gas is increased and a warm-up progress balance according to progress states of warm-up of the reformer and warm-up of the fuel cell is thereby controlled when a warm-up degree of the reformer based on the temperature of the reformer is greater than a warm-up degree of the fuel cell based on the temperature of the fuel cell, the warm-up degree of the fuel cell being a ratio of the temperature of the fuel cell acquired to a warm-up target temperature of the fuel cell, and the warm-up degree of the reformer being a ratio of the temperature of the reformer acquired to a warm-up target temperature of the reformer.

* * * * *